(12) United States Patent
Sakai et al.

(10) Patent No.: US 8,724,093 B2
(45) Date of Patent: May 13, 2014

(54) APPARATUS AND METHOD FOR DETECTING DIVISION LINES DEPICTED ON ROAD

(75) Inventors: Hiroshi Sakai, Mizuho (JP); Hideaki Tanaka, Nagoya (JP)

(73) Assignee: DENSO CORPORATION, Kariya (JP)

( * ) Notice: Subject to any disclaimer, the term of this patent is extended or adjusted under 35 U.S.C. 154(b) by 310 days.

(21) Appl. No.: 13/072,896

(22) Filed: Mar. 28, 2011

(65) Prior Publication Data

US 2011/0234450 A1    Sep. 29, 2011

(30) Foreign Application Priority Data

Mar. 26, 2010 (JP) ................................ 2010-071882
Feb. 3, 2011 (JP) ................................ 2011-021802

(51) Int. Cl.
*G01C 3/08* (2006.01)

(52) U.S. Cl.
USPC ....... 356/5.01; 356/3.01; 356/4.01; 356/5.09; 356/9; 356/625; 356/3.09

(58) Field of Classification Search
USPC ......... 356/3.01–3.09, 4.01, 5.01, 5.09, 9, 625
See application file for complete search history.

(56) References Cited

U.S. PATENT DOCUMENTS 4,397,285 A * 8/1983 O'Neill ......................... 123/502
6,317,202 B1 11/2001 Hosokawa et al.
7,136,040 B1 * 11/2006 Park et al. ..................... 345/100
2005/0093735 A1 5/2005 Samukawa et al.
2007/0276599 A1 11/2007 Ogawa

FOREIGN PATENT DOCUMENTS

| JP | A-7-244154 | 9/1995 |
|---|---|---|
| JP | A-10-090413 | 4/1998 |
| JP | A-2000-147124 | 5/2000 |
| JP | A-2003-065740 | 3/2003 |
| JP | A-2003-121546 | 4/2003 |
| JP | A-2004-098792 | 4/2004 |
| JP | A-2004-139338 | 5/2004 |
| JP | A-2004-198323 | 7/2004 |
| JP | A-2005-069739 | 3/2005 |
| JP | A-2005-222538 | 8/2005 |
| JP | A-2007-316767 | 12/2007 |
| JP | A-2009-140175 | 6/2009 |
| JP | A-2010-060299 | 3/2010 |

* cited by examiner

*Primary Examiner* — Isam Alsomiri
*Assistant Examiner* — Samantha K Abraham
(74) *Attorney, Agent, or Firm* — Posz Law Group, PLC

(57) ABSTRACT

A division line depicted on a road is detected. A beam-formed electromagnetic wave is repetitively at intervals transmitted toward the road viewed from a vehicle to scan in the vehicle width direction. Each beam-formed electromagnetic wave is radiated to a radiation area on the road, and the radiation areas made by transmitting the beam-formed electromagnetic wave a plurality of times virtually produces a scan area on the road. Every beam-formed electromagnetic wave, distance data indicative of a distance between a division line on the road and the vehicle is measured based on information about a reflected electromagnetic wave. The distance data measured is received to detect the division line based on characteristics of changes in a sequence of the distance data produced by mapping the received distance data in a scanning order of the beam-formed electromagnetic wave.

26 Claims, 12 Drawing Sheets

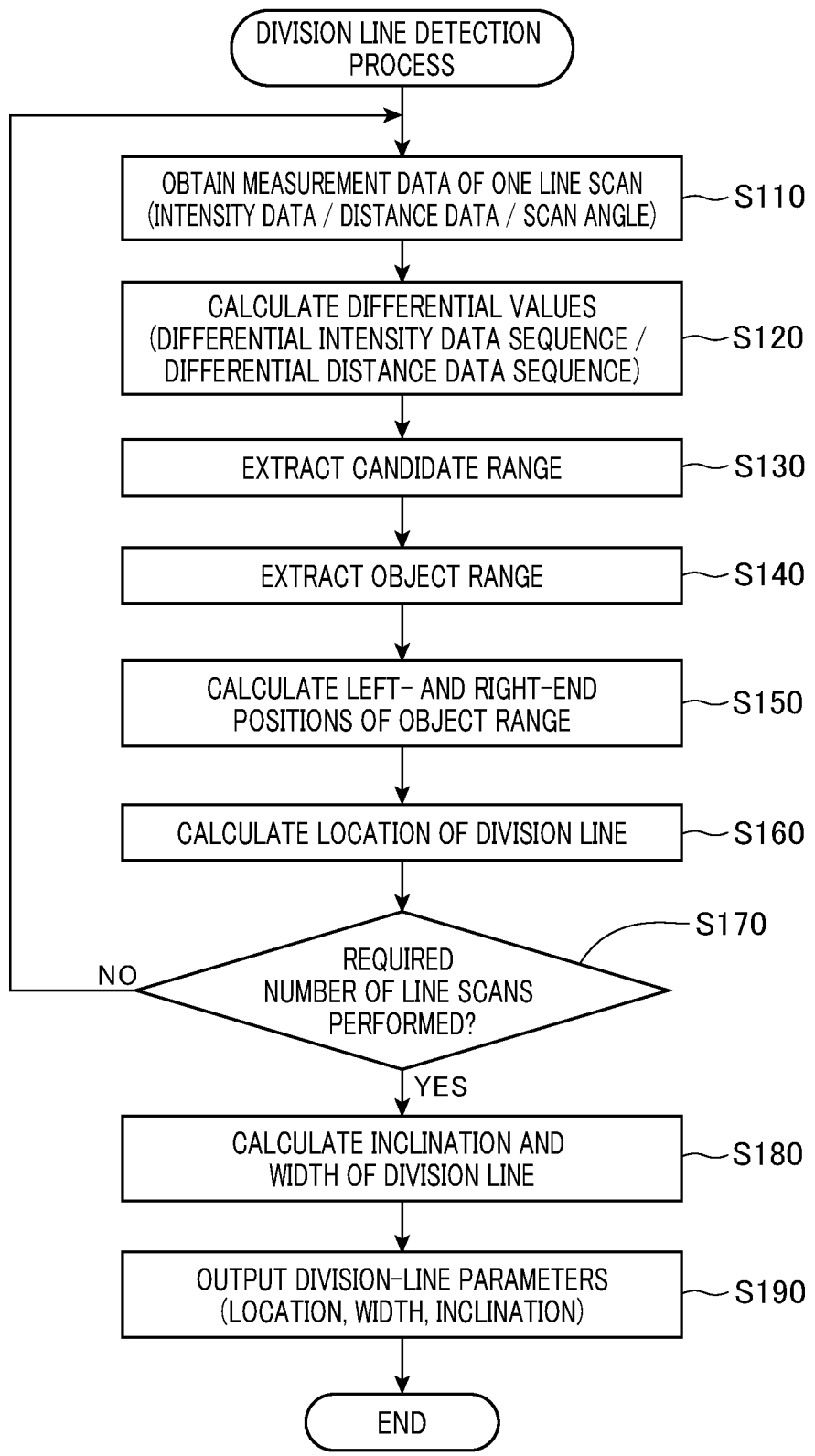

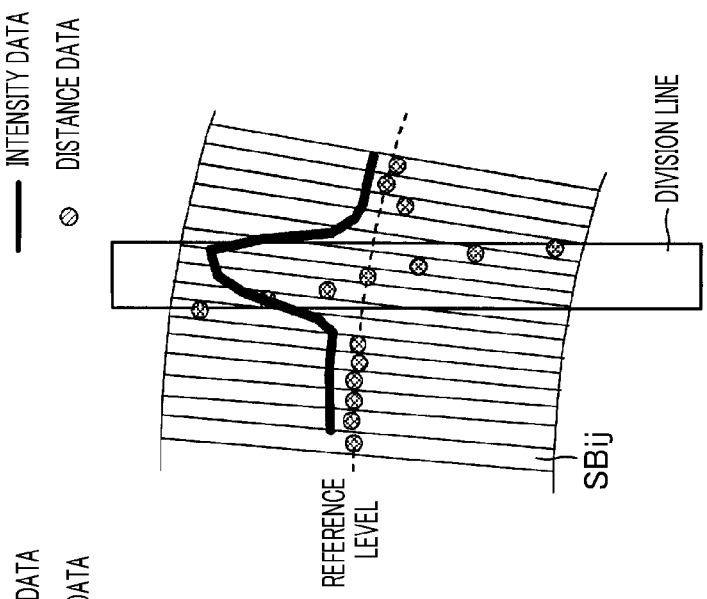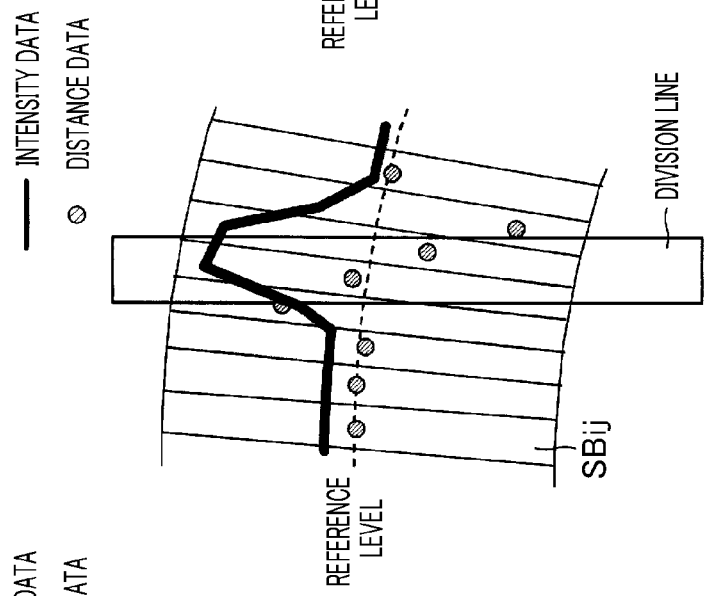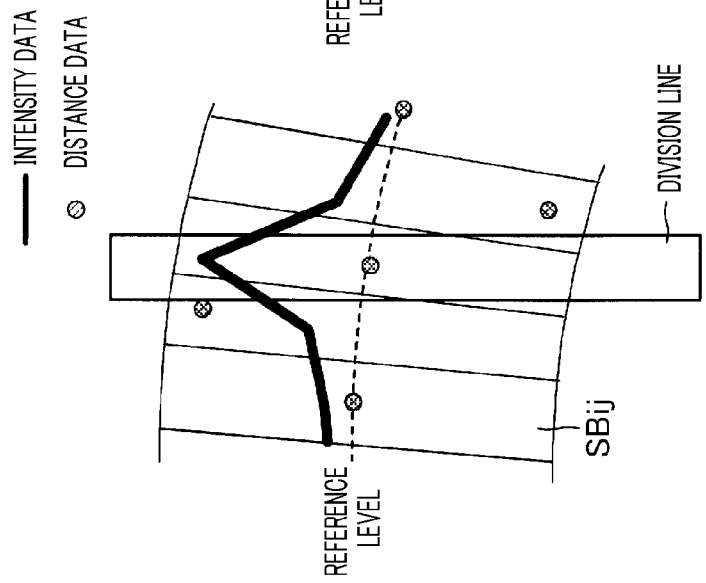

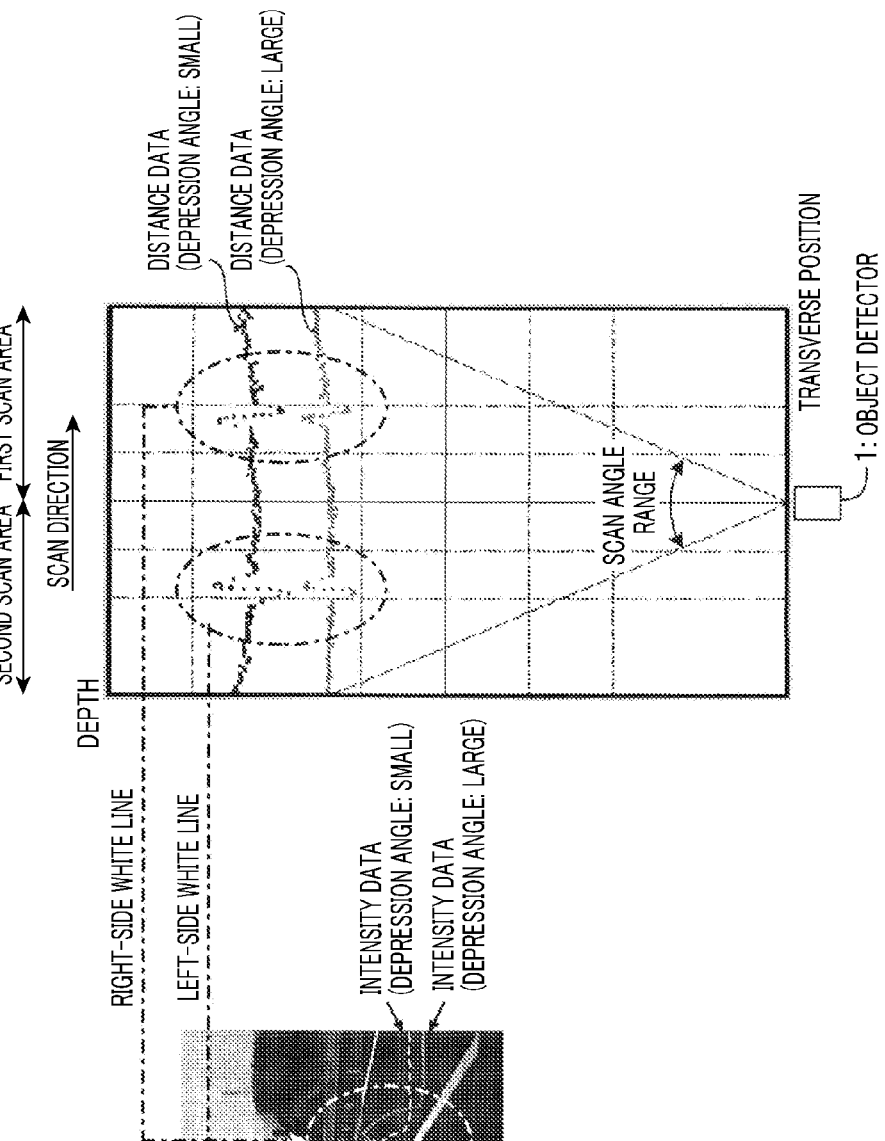
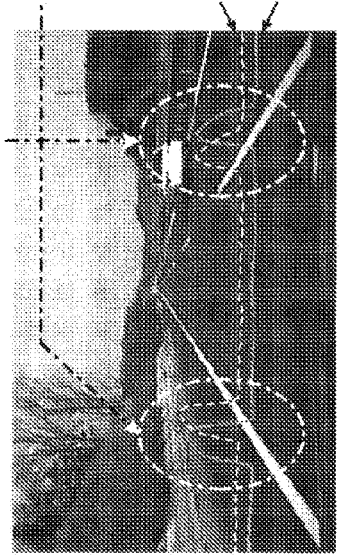
FIG. 8A
FIG. 8B

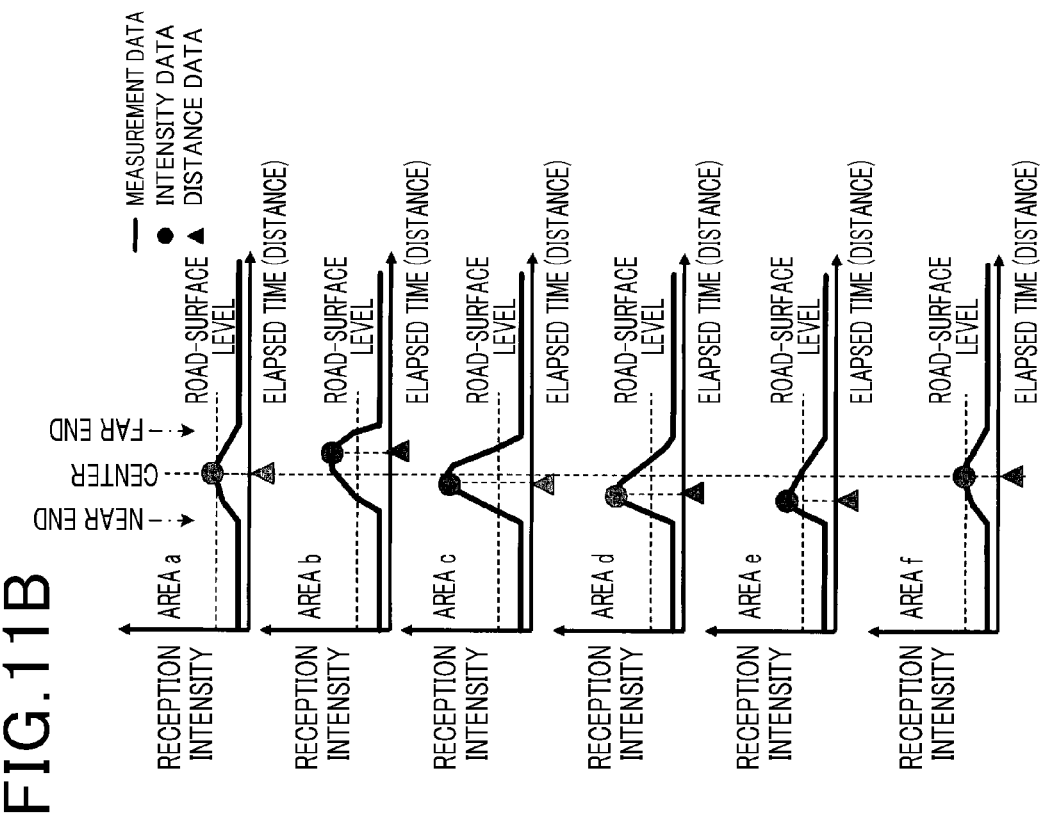
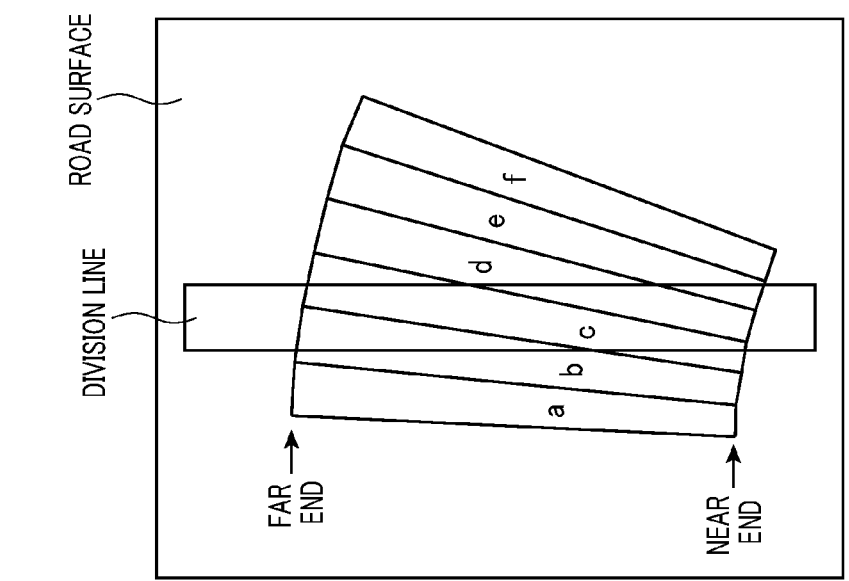

APPARATUS AND METHOD FOR DETECTING DIVISION LINES DEPICTED ON ROAD

CROSS-REFERENCE TO RELATED APPLICATION

This application is based on and claims the benefit of priorities from earlier Japanese Patent Application Nos. 2010-071882 and 2011-021802 filed Mar. 26, 2010 and Feb. 3, 2011, respectively, the descriptions of which are incorporated herein by reference.

BACKGROUND OF THE INVENTION

1. Technical Field of the Invention

The present invention relates to an apparatus for detecting division lines, which apparatus is able to detect division lines painted on a road surface, for example, to indicate roadsides, lane lines, park lanes, and the like, and to a method for detecting division lines.

2. Related Art

An apparatus has been known, with which division lines are detected to effect control, such as lane-keeping control, of the vehicle equipped with the apparatus.

For example, JP-A-2003-121546 discloses, as such an apparatus, an apparatus that uses a luminance difference between a lane marker (including a division line) and a road surface, which luminance difference is obtained from an image of a landscape picked up by a camera in the forward direction of the vehicle. This apparatus also recognizes a lane marker by performing pattern matching against display/arrangement patterns of lane markers prepared in advance. This patent document also discloses an apparatus that uses a laser radar in combination to identify the type of a lane marker, based on the reflection intensity of a laser beam (electromagnetic wave) and selects an optimum recognition method depending on the type of the lane marker identified.

Also, JP-A-2004-139338 suggests making use of a laser radar. This laser radar is installed in a vehicle to detect a distance and a relative speed, for example, between a preceding vehicle and the vehicle installing the laser radar. This patent document suggests using this laser radar for the detection of a division line.

The technique disclosed in JP-A-2003-121546 is able to detect the location of a division line based on the reflection intensity of a laser beam, however, is not able to accurately calculate the edges of the division line. Therefore, if this technique of detecting a division line is applied to a technique, such as of lane keeping control, that requires high safety, the detection accuracy is required to be improved.

Also, as disclosed in JP-A-2004-139338, use of two techniques, i.e. camera and laser, in combination enables calculation of the edges of a division line. However, this necessitates installing both of a camera and a laser and thus increases the size of the apparatus as a whole.

SUMMARY

Hence, it is desired to provide an apparatus for detecting division lines on a road surface, based on the results of reception/transmission of electromagnetic waves, which apparatus is able to enhance the accuracy of detecting a division line without using a camera.

As a first aspect of the present disclosure, there is provided an apparatus for detecting a division line depicted on a road on which a vehicle equipped with the apparatus, comprising: beam scanning means for scanning a beam-formed electromagnetic wave toward the road viewed from the vehicle, the beam-formed electromagnetic wave being transmitted repetitively at intervals along different directions in a width direction of the vehicle and an reflected electromagnetic wave from the road being received, each beam-formed electromagnetic wave being radiated to a radiation area on the road, the radiation areas radiated a plurality of times by the beam-formed electromagnetic wave virtually producing a scan area on the road; measuring means for measuring, every beam-formed electromagnetic wave, distance data indicative of a distance between a division line on the road and the vehicle, based on information about the reflected electromagnetic wave received by the beam scanning means; data receiving means for receiving the distance data measured by the measuring means; and detecting means for detecting the division line on the road based on characteristics of changes in a sequence (set) of the distance data (i.e., distance data sequence) produced by mapping the received distance data in a scanning order of the beam-formed electromagnetic wave.

As a second aspect, in the confirmation according to the first aspect, in particular, the measuring means measures, every beam-formed electromagnetic wave, both intensity data indicative of intensity of the received reflected electromagnetic wave and distance data indicative of a distance between a division line on the road and the vehicle, based on information about the reflected electromagnetic wave received by the beam scanning means; data receiving means receives both the intensity data and the distance data measured by the measuring means; and detecting means detects the division line on the road based on characteristics of changes in both a sequence (set) of the intensity data (i.e., intensity data sequence) and a sequence (set) of the distance data (distance data sequence) produced by mapping the received intensity data and distance data in a scanning order of the beam-formed electromagnetic wave, respectively.

Each beam has a radiation plane in which each beam is radiated to the road surface. This radiation plane here is referred to as "road-surface radiation area". Also, a region corresponding to the total of the road-surface areas of the beams is referred to as "scan area". The term "division lines" refers to dotted or solid white or yellow lines and zebra zone lines painted on a road surface, or combined lines and the like for dividing a passage way painted on a road surface, or various lines painted on a road surface to indicate park lanes in a parking area.

FIG. 10 is an explanatory diagram illustrating a relationship between transmission/reception timing of an electromagnetic wave and a distance up to a target from which the electromagnetic wave is reflected. As shown in the figure, the time difference between the transmission timing and the reception timing is proportional to the time required for an electromagnetic wave to make a round trip of a distance up to the target, or further, in proportion to the distance up to the target. Therefore, the detection results of the time difference can be used as distance data. As is well known, this method of detecting a distance up to a target of reflecting an electromagnetic wave based on a round-trip time of the electromagnetic wave for the distance is called a time-of-flight method.

FIG. 11A is a schematic diagram illustrating a state where a division line overlaps road-surface radiation areas "a" to "f." FIG. 11B is a graph illustrating waveforms of reception signals detected using the beams corresponding to the respective road-surface radiation areas a to f.

As shown in FIGS. 11A and 11B, in any one of the road-surface radiation areas a to f, the level of the reception signal rises higher than the level at which no signal is inputted.

Specifically, this signal rise starts from a point of distance (time required for an electromagnetic wave to make a round trip of the distance) proximate to a near end to a point of distance (time required for an electromagnetic wave to make a round trip of the distance) proximate to a far end in a road-surface radiation area.

However, in the road-surface radiation areas a and f each having no region overlapping the division line, the signal level is peaked in the vicinity of the center between the near and far ends. The peak value of each of these areas a and f corresponds to a road-surface level that is the level of reflection from the road surface on which no division line or the like is drawn. The peak value is used as the intensity data, while the time expired from the timing of transmitting an electromagnetic wave to the timing when the peak value is generated is used as the distance data.

In each of the road-surface radiation areas b to e having a region overlapping the division line (this region is hereinafter referred to "overlap region"), a peak value larger than the road-surface level is obtained. In addition, the position of the peak (i.e. distance data) changes, depending on the location of each overlap region, which location is different between the areas b to e. Further, the value of the peak (i.e. intensity data) increases or decreases, depending on the space of each overlap region, which space is different between the areas b to e.

Specifically, in the road-surface radiation area b where the overlap region resides on the side of the far end, the signal level is peaked on a far-end side with reference to the center of the area b. In the road-surface area c where the overlap region resides extending over the entire area c, the signal level peaks in the vicinity of the center thereof. In the road-surface radiation areas d and e in each of which the overlap region resides on the side of the near end, the signal level is peaked on the near-end side with reference to the center of each of the areas d and e. The peak value of the signal level is in conformity with the spaces of the overlap regions. Specifically, the peak value is maximized in the road-surface radiation area c and becomes smaller in the order of the road-surface radiation areas b, d and e.

Preferably, the detecting means includes means for estimating the characteristics of the changes in the sequence of the distance data based on a signal showing the received beam-formed electromagnetic wave scanned a plurality of times in the width direction, the signal changing depending on a position of an overlap region in the radiation region, the radiation area produced every time the beam-formed electromagnetic wave is radiated being overlapped with the division line in the overlap region on the road.

The detecting means may include means for estimating the characteristics of the changes in both the sequence of the intensity data and the sequence of the distance data based on a signal showing the received beam-formed electromagnetic wave scanned a plurality of times in the width direction, the signal changing depending on both a position and an area of an overlap region in the radiation region, the radiation area produced every time the beam-formed electromagnetic wave is radiated being overlapped with the division line in the overlap region on the road.

Thus, the apparatus for detecting division lines of the present disclosure detects a division line by performing a determination process regarding the conditions of the overlap of adjacently located road-surface radiation areas with the division line that is an object to be detected (i.e. regarding the positional relationship between the overlap regions and the spaces of the overlap regions in road-surface radiation areas). In short, the division line is detected based on the change of the location and the change of the space of each of the overlap regions in adjacently located road-surface radiation areas.

FIG. 4A is an explanatory diagram illustrating the road-surface radiation areas illustrated in FIG. 11A, with the intensity data and the distance data illustrated in FIG. 11B being superposed. In the graph at the top in FIG. 4B, the intensity data are plotted with the direction along which the road-surface radiation areas are arranged (scan angle) being used as the horizontal axis. Similarly, in the graph at the bottom in FIG. 4B, the distance data are plotted with the direction along which the road-surface radiation areas are arranged (scan angle) being used as the horizontal axis.

Let us discuss the case where a division line resides in a right-side scan area (hereinafter referred to as "right-half area") with reference to a front direction that is the center of the scan area (i.e. the state shown in FIG. 11A), and where scan is performed from the left to the right (from the areas a to f in FIG. 11A) of the scan area (hereinafter referred to "first detection condition"). In this case, the space of overlap region increases for a time and then decreases, while the location of overlap region moves from the farthest end side toward the nearest end side.

However, the direction in which the division line resides (the direction from the bottom toward the top in FIG. 11A) is inclined to the left with reference to the direction from the near end toward the far end (orientation of the beam) of each of the road-surface radiation areas b to e overlapping the division line.

The intensity data changes as follows. Specifically, the intensity data, as indicated by the solid line in FIG. 4A and by the graph at the top in FIG. 4B, indicates the road-surface level before the road-surface radiation areas intersect the division line. The intensity data then indicates levels (larger than the road-surface level) in conformity with the spaces of the respective overlap regions in a part of the scan area where the road-surface radiation areas intersect the division line. The intensity data again indicates the road-surface level outside of the part of the scan area where the road-surface radiation areas intersect the division line.

The distance data changes as follows. Specifically, the distance data, as indicated by dots in FIG. 4A and by the graph at the bottom in FIG. 4B, indicates a reference level before the road-surface radiation areas intersect the division line, the reference level corresponding to a distance in the vicinity of a middle point between the far and near ends in each of the road-surface radiation areas. Then, in a part of the scan area where the road-surface radiation areas intersect the division line, the distance data indicates, for a time, an increase up to a high level corresponding to the distance in the vicinity of the far end of the road-surface radiation areas, in conformity with the change of location of the respective overlap regions of the road-surface radiation areas. After that, the distance data indicates a decrease down to a low level corresponding to the distance in the vicinity of the near end of the road-surface radiation areas. Then, the distance data again indicates the reference level out of the part of the scan area where the road-surface radiation areas intersect the division line.

Let us now discuss the case where the division line resides in a left-side scan area (hereinafter referred to as "left-half area") with reference to the front direction, and that the division line is scanned from the right to the left in the scan area (hereinafter referred to "second detection condition").

In this case, the intensity data sequence and the distance data sequence change similar to the case of the first detection condition. However, in this case, the division line is located being inclined to the right with reference to the direction from the near end toward the far end of each of the road-surface radiation areas b to e overlapping the division line.

Let us now discuss the case where the division line residing in the right-half area is scanned from the right to the left of the scan area (hereinafter referred to as "third detection condition"), or the case where the division line residing in the left-half area is scanned from the left to the right of the scan area (hereinafter referred to as "fourth detection condition").

In this case, the intensity data sequence changes similar to the cases of the first and second detection conditions. However, the distance data sequence changes in an opposite manner. Specifically, the distance data sequence indicates a decrease, for a time, from the reference level to a level corresponding to the distance in the vicinity of the near end of the road-surface radiation areas. Then, the distance data sequence indicates an increase up to a level corresponding to the distance in the vicinity of the far end of the road-surface radiation areas and then returns to the reference level.

In this way, the intensity data sequence and the distance data sequence each exhibit characteristic change within an angle range in which reflected light is obtained from the division line. In particular, the distance data sequence exhibits a change unique to the shape of the division line that is an object to be detected, i.e. unique to a band shape extending long.

Specifically, according to the apparatus for detecting division lines of the present disclosure, a division line is detected using the features appearing on a distance data sequence when multiple consecutive road-surface radiation areas overlap the division line. Accordingly, the edges of the division line are appropriately detected and thus the division line on the road surface is detected with good accuracy.

Regarding the distance data sequence, the features of the change appearing thereon are small when multiple consecutive road-surface radiation areas overlap the division line. Therefore, the features, per se, appearing on the distance data sequence are likely to be determined as being noise.

In this regard, the apparatus for detecting division lines of the present disclosure uses not only the features appearing on a distance data sequence but also the features appearing on an intensity data to detect a division line. Thus, the apparatus is able to define the location of a division line based on the level of reflection intensity of a reception signal, and then to detect the edges of the division line that is an object to be detected using the distance data sequence. Thus, a division line is more reliably detected with good accuracy.

Thus, the apparatus for detecting a division line of the present disclosure is favorably used for the control, such as lane keeping assist, under which the location of a division line is required to be calculated with good accuracy in order to ensure safety.

It is preferred that the detecting means comprises extracting means for extracting distance data of a road position from which a predetermined change in the characteristics are estimated; and location calculating means for calculating a location of the division line based on the distance data extracted by the extracting means.

It is also the detecting means comprises extracting means for extracting distance data from which a predetermined specific change is detected, from the sequence of the distance date detected in a candidate range, the candidate range being part of the scan area, the part of the scan area providing a specific part of intensity data which belong to the sequence of the intensity data and continuously has a magnitude showing existence of an object in the sequence of the intensity data; and position calculating means for calculating a position of the division line based on the distance data extracted by the extracting means.

The required intensity continuing portion may be extracted by simply comparing each of pieces of intensity data forming the intensity data sequence with a predetermined threshold. Alternatively, a differential intensity data sequence obtained by differentiating the intensity data sequence may be used for the extraction.

FIG. 12A is a graph showing changes of values of an intensity data sequence (solid line) and a differential intensity data sequence (dash-dot line) in the required intensity continuing portion.

As shown in FIG. 12A, when a differential intensity data sequence is used, a portion exhibiting the following change may be extracted as the required intensity continuing portion. Specifically, the change is that the polarity of the differential intensity data turns to positive and then successively turns to negative.

Still preferably, the specific change of the distance data is either a first change that the distance data is temporarily increased more than a predetermined reference level, then decreased less than the reference level, and then returns to the reference level or a second change that the distance data is temporality decreased less than the reference level, then increased more than the reference level, and then returns to the reference level.

It should be appreciated that the former change is detected under the first or second detection condition, while the latter change is detected under the third or fourth detection condition.

In extracting the specific change, a distance data sequence may be used as it is. Alternatively, the detecting means include means for differentiating the sequence of the intensity data to obtain a sequence of differentiated intensity data, and means for providing, to the specific part of the intensity data, a part of the sequence of the differentiated intensity data, the part of the sequence of the differentiated intensity data showing a change in a polarity thereof such that the polarity is once positive and then maintained continuously negative.

FIG. 12B is a graph showing changes of values of a distance data sequence (solid line) and a differential distance data sequence (dash-dot line) in road-surface radiation areas where a division line resides.

As shown in FIG. 12B, when a differential distance data sequence is used, it is preferred that detecting means includes means for differentiating the sequence of the distance data to obtain a sequence of differentiated distance data, and means for providing, to the specific change of the distance data, a part of the sequence of the differentiated distance data, the part of the sequence of the differentiated distance data showing either a first change in a polarity thereof or a second change in the polarity thereof, the first change in the polarity of the differentiated distance data showing a temporary negative polarity before and after a continuous positive polarity, the second change in the polarity of the differentiated distance data showing a temporary positive polarity before and after a continuous negative polarity.

It should be appreciated that the former change is detected under the first or second detection condition, while the latter change is detected under the third or fourth detection condition.

FIG. 12C is a graph showing the changes of an intensity data sequence and a differential intensity data sequence in the case where an offset level (road-surface level/reference level) of intensity data has been fluctuated by the changes of road-surface conditions. FIG. 12B is a graph showing the changes of a distance data sequence and a differential distance data sequence in the similar case.

The changes of road-surface conditions may include, for example, changes caused by weather (dry, humid, frozen, etc.) as well as changes caused by the materials of the road (asphalt or concrete) or caused by the road characteristics (draining or non-draining).

As shown in FIGS. 12C and 12D, if the offset level of the intensity data or the distance data is fluctuated, the differential intensity data sequence or the differential distance data sequence is not affected by the fluctuation.

Accordingly, the apparatus for detecting division lines of the present disclosure is able to correctly extract the change that appears on the intensity data sequence or the distance data sequence through the same procedure, irrespective of the changes of conditions. In addition, the apparatus for detecting division lines of the present disclosure is able to further enhance the accuracy of detecting a division line.

Still, it is preferred that the location calculating means is adapted to calculate, as the location of the division line, a location based on both specific distance data detected at an end near to a center of each of the radiation areas and an angle showing a direction of the beam-formed electromagnetic wave radiated to obtain the specific distance data.

The location calculating means may be adapted to calculate, as the location of the division line, a center between two locations based on both the distance data detected at both ends of the candidate range and angles showing directions of the beam-formed electromagnetic wave used to obtain the distance data detected at both ends of the candidate range.

Still the location calculating means may be adapted to calculate, as the location of the division line, a location based on both the distance data detected before and after the candidate range and an angle showing a point at which the distance data cross a level of reference data in the candidate range, the reference data being composed of the distance data detected before and after the candidate range.

Still further, the location calculating means may be adapted to calculate, as the location of the division line, a location based on an angle showing a direction of the electromagnetic wave used to obtain the intensity data showing a maximum value thereof within the candidate range and the distance data acquired by the electromagnetic wave used to obtain the intensity data showing the maximum value thereof within the candidate range.

Still preferably, the apparatus has inclination calculating means for calculating an inclination of the division line based on data sequentially in time calculated by the location calculating means.

It is also preferred that the beam scanning means is configured to scan the beam-formed electromagnetic wave such that two or more mutually juxtaposed radiation areas among the radiation areas are overlapped with the division line in the scan area, except that a direction of any of the beam-formed electromagnetic waves agrees with a direction of the division line.

FIGS. 6A to 6C are explanatory diagrams illustrating detection results of intensity data and distance data, being superposed on the road-surface radiation areas. The width of the road-surface radiation area in FIG. 6B is used as a reference width. The width of the road-surface radiation area in FIG. 6A is made smaller than the reference width by a factor of two. The width of the road-surface radiation area in FIG. 6C is made larger than the reference width by a factor of two.

As shown in FIGS. 6A to 6C, as the width of a road-surface radiation area is narrowed, a division line is likely to overlap more number of road-surface radiation areas. Therefore, change of intensity data or distance data is specifically detected, and further, features of the change are more appropriately grasped. However, as shown in FIG. 7, in extracting the change of distance data or intensity data, at least two road-surface radiation areas may be ensured to overlap a division line.

Still, the beam scanning means may be configured to scan the beam-formed electromagnetic wave such that each of the radiation areas has a first length in a direction of the beam-formed electromagnetic wave and a second length in an alignment direction along which the radiation areas align, the first length being longer than the second length.

FIGS. 13A and 13B show road-surface radiation areas each having the same area but having a different aspect ratio. Specifically, FIG. 13A shows longitudinally long regions (L>W), and FIG. 13B shows transversely long regions (L<W), where L is a length in the longitudinal direction and W is a length in the traverse direction.

As shown in FIGS. 13A and 13B, on the condition that the road-surface radiation areas each have the same area, a higher number of road-surface radiation areas is likely to overlap a division line, as the road-surface radiation areas are more elongated in the longitudinal direction. In addition, the features of change in distance data may be more easily captured because the change of the distance data will become larger.

The beam forming means may be adequately set with attachment conditions (height from the road surface, or angle with respect to the road surface) of the beam forming means, the shape (beam width, or maximum detection distance) of the beams to be radiated, the scan area, and the like, based such as on the width of a division line that is an object to be detected. Since what is important here is the shape of each road-surface radiation area, the beam shape in a radiation source may be long in the transverse direction.

As a third aspect, there is an apparatus for detecting a division line depicted on a road on which a vehicle equipped with the apparatus travels, comprising: beam scanning means for scanning a beam-formed electromagnetic wave toward the road viewed from the vehicle, the beam-formed electromagnetic wave being transmitted repetitively at intervals along different directions in a width direction of the vehicle and an reflected electromagnetic wave from the road being received, each beam-formed electromagnetic wave being radiated to a radiation area on the road, the radiation areas radiated a plurality of times by the beam-formed electromagnetic wave virtually producing a scan area on the road; and detecting means for detecting the division line on the road based on information related to the transmission of the beam-formed electromagnetic wave and the reception of the reflected electromagnetic wave, wherein the detecting means is configured to detect the division line based on a signal showing the received beam-formed electromagnetic wave scanned a plurality of times in the width direction, the signal changing depending on a position of an overlap region in the radiation region, the radiation area produced every time the beam-formed electromagnetic wave is radiated being overlapped with the division line in the overlap region on the road.

According to this apparatus, the edges of a division line are appropriately detected and thus the division line on a road surface is detected with good accuracy.

As a fourth aspect, in the configuration according to the third aspect, the detecting means detects the division line on the road based on information related to the transmission of the beam-formed electromagnetic wave and the reception of the reflected electromagnetic wave, wherein the detecting means is configured to detect the division line based on a signal showing the received beam-formed electromagnetic wave scanned a plurality of times in the width direction, the signal changing depending on both a position and an area of an overlap region in the radiation region, the radiation area produced every time the beam-formed electromagnetic wave is radiated being overlapped with the division line in the overlap region on the road.

Thus, according to the apparatus for detecting division lines of the present disclosure, a division line on a road surface is reliably detected with good accuracy.

A method for detecting division lines of the present disclosure made to fulfill the above object uses a plurality of beams directed toward a road surface and differently oriented with a beam angle being spread in the transverse direction. Each beam has a radiation plane in which each beam radiates the road surface. This radiation plane here is referred to as "road-surface radiation area". Also, a region corresponding to the total of the road-surface surface areas of the beams is referred to as "scan area".

As a fifth aspect of the present disclosure, there is provided a method of detecting a division line depicted on a road on which a vehicle travels, comprising steps of: scanning a beam-formed electromagnetic wave toward the road viewed from the vehicle, the beam-formed electromagnetic wave being transmitted repetitively at intervals along different directions in a width direction of the vehicle and an reflected electromagnetic wave from the road being received, each beam-formed electromagnetic wave being radiated to a radiation area on the road, the radiation areas radiated a plurality of times by the beam-formed electromagnetic wave virtually producing a scan area on the road; measuring, every beam-formed electromagnetic wave, distance data indicative of a distance between a division line on the road and the vehicle, based on information about the reflected electromagnetic wave received; receiving the distance data measured; and detecting the division line on the road based on characteristics of changes in a sequence of the distance data produced by mapping the received distance data in a scanning order of the beam-formed electromagnetic wave.

Thus, according to the method, the same advantages as those obtained by the apparatus of the first aspect can be obtained. In addition, a method of detecting a division line according to the present disclosure can be practiced or developed in various variations according to the foregoing features of the apparatus for detecting a division line.

BRIEF DESCRIPTION OF THE DRAWINGS

In the accompanying drawings:

FIG. 3 is a flow diagram illustrating a division line detection process performed by a controller of the object detector;

FIGS. 6A to 6C are explanatory diagrams each illustrating a relationship between the width of a road-surface radiation area and detection accuracy;

FIGS. 8A and 8B illustrate actual measurement values of intensity data and distance data;

FIG. 11A is a schematic diagram illustrating an example of a state where a division line overlaps road-surface radiation areas;

FIG. 11B shows graphs illustrating the waveforms of received signals which are detected using the beams corresponding to the respective road-surface radiation areas of FIG. 11A;

DETAILED DESCRIPTION OF THE PREFERRED EMBODIMENTS

With reference to the accompanying drawings, hereinafter is described an embodiment of the present invention.

Figure 1:
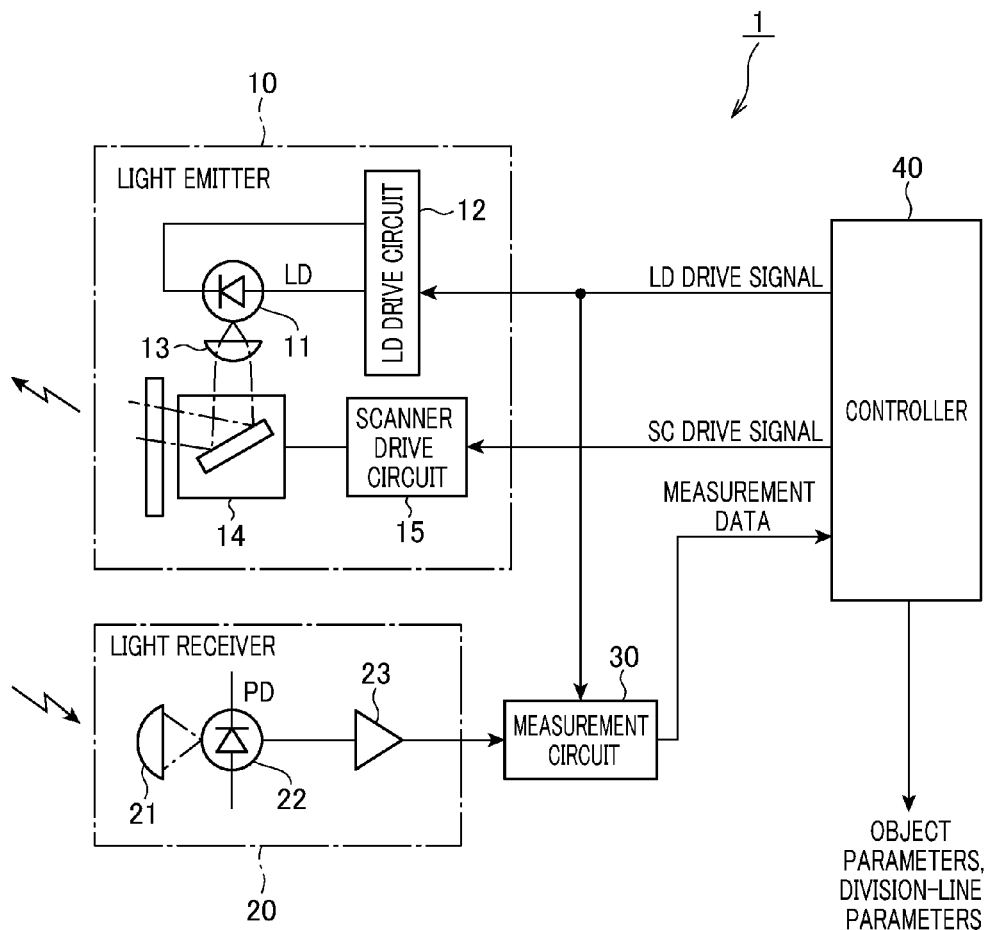
FIG. 1 is a block diagram illustrating a general configuration of an object detector to which the present invention is applied.
Figure 2:
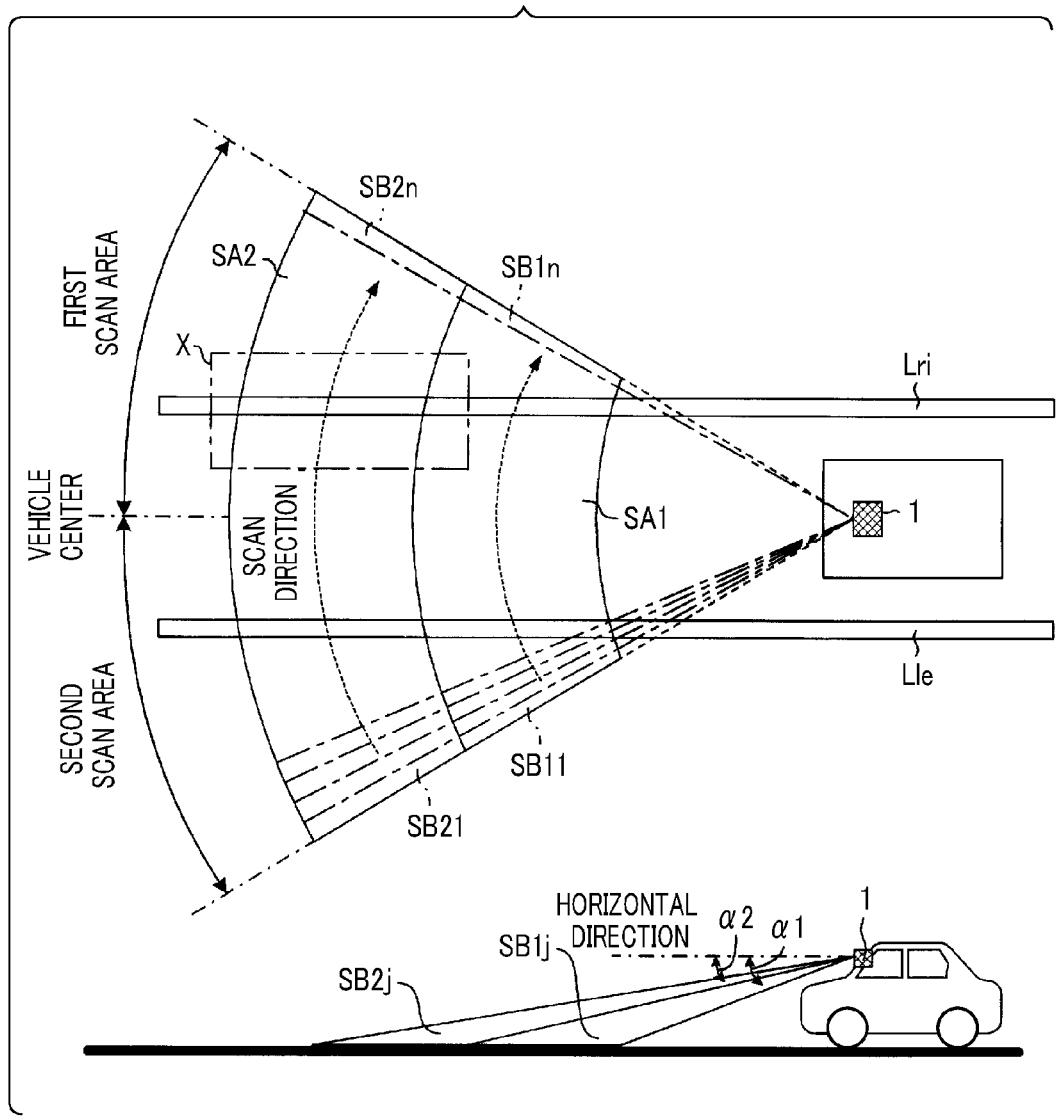
FIG. 2 is an explanatory diagram illustrating a radiation range, for example, of laser beams emitted from the object detector.

FIG. 1 is a block diagram illustrating a general configuration of an object detector 1 to which the present invention is applied. FIG. 2 is an explanatory diagram illustrating a position of attaching the object detector 1 and a radiation range, for example, of laser beams (electromagnetic waves).

The object detector 1 recognizes, for example, objects located in the forward direction of the vehicle and traffic marking painted on the road surface, and generates object parameters and division-line parameters. The object parameters include information associated with the object (location, size, relative speed, etc.). The division-line parameters include information associated with division lines that indicate, for example, a lane line of a traffic lane (location, inclination, etc.).

The term "division lines" refers to dotted or solid white or yellow lines and zebra zone lines painted on a road surface, or combined lines and the like for dividing a passage way painted on a road surface, or various lines painted on a road surface to indicate parking lanes in a parking area.

The object parameters and the division-line parameters generated by the object detector 1 are supplied to a vehicle control unit (not shown).

For example, the object parameters are used for alarm control and so-called inter-vehicle control. Under the alarm control, an alarm is raised if the object indicated by the object parameters corresponds to an object that resides in a preset alarm region. Under the inter-vehicle control, the brake, the throttle and the automatic transmission, for example, are actuated to control the vehicle speed, according to the conditions of a preceding vehicle if the object indicated by the object parameters is the preceding vehicle.

For example, the division-line parameters are used for so-called lane-keeping control. Under the lane-keeping control, an alarm is raised so as not to allow the vehicle to deviate from a traffic lane identified based on the division-line parameters, or the travel conditions of the vehicle are controlled.

In other words, the configuration for generating the division-line parameters in the object detector 1 corresponds to the apparatus for detecting division lines of the present invention.

As shown in FIG. 1, the object detector 1 includes a light emitter 10, a light receiver 20, a measurement circuit 30 and a controller 40. The light emitter 10 scans the forward direction of the vehicle, using laser beams. The light receiver 20 receives light reflected from an object to which the laser beams have been radiated from the light emitter 10. The measurement circuit 30 measures time from when a laser beam is radiated from the light emitter 10 until when the reflected light of the laser beam is received by the light receiver 20, measures the intensity of the light received by the light receiver 20, and generates measurement data. The controller 40 outputs a signal for driving the light emitter 10 and generates the object parameters and the division-line parameters based on the measurement data generated by the measurement circuit 30.

The object detector 1 is attached to a position, such as near a room mirror in the vehicle cabin, from which the road surface in the forward direction of the vehicle can be over looked (see FIG. 2).

The light emitter 10 includes a laser diode (LD) 11, an LD drive circuit 12, a light-emitting lens 13, a scanner mechanism 14 and a scanner drive circuit 15. The LD 11 generates laser beams. The LD drive circuit 12 allows the LD 11 to generate pulsed laser beams in response to an LD drive signal from the controller 40. The light-emitting lens 13 narrows a beam width of the laser beam generated by the LD 11. The scanner mechanism 14 has a mirror that reflects the laser beams supplied via the light-emitting lens 13. The scanner mechanism 14 supports the mirror so that the direction of radiating the light reflected from the mirror can be changed within a predetermined angle range (hereinafter referred to as "scan angle range") in a widthwise direction of the vehicle. The scanner mechanism 14 is configured to change the depression angle (downward angle with respect to a horizontal direction) of a beam, along the direction of the vehicle height. The scanner drive circuit 15 drives the scanner mechanism 14 according to an SC drive signal from the controller 40 to realize two-dimensional beam scan.

The controller 40 outputs the SC drive signal which operates the scanner mechanism 14 such that the scan direction of the radiated laser beams in a horizontal plane coincides with one transverse direction (from the left corner to the right corner in FIG. 2) within the scan angle range, with the depression angle of the beams being fixed. At the same time, the controller 40 also outputs an LD drive signal which operates the LD drive circuit 12 such that the laser beams from the LD 11 are intermittently and evenly (in an even angle) radiated.

In the following description, when a term "line scan" is used, the term refers to an action which makes the radiated laser beams scan in one transverse direction mentioned above in the scan angle range, with the depression angle of the beams being fixed.

When the direction of radiating the laser beams has reached the end of the scan angle range to finish line scan corresponding to one line, the depression angle of the beams is changed by a predetermined angle to repeat line scan in the similar manner. Thus, the laser beams are sequentially radiated to the entire predetermined scan area.

Figures 13A, 13B:
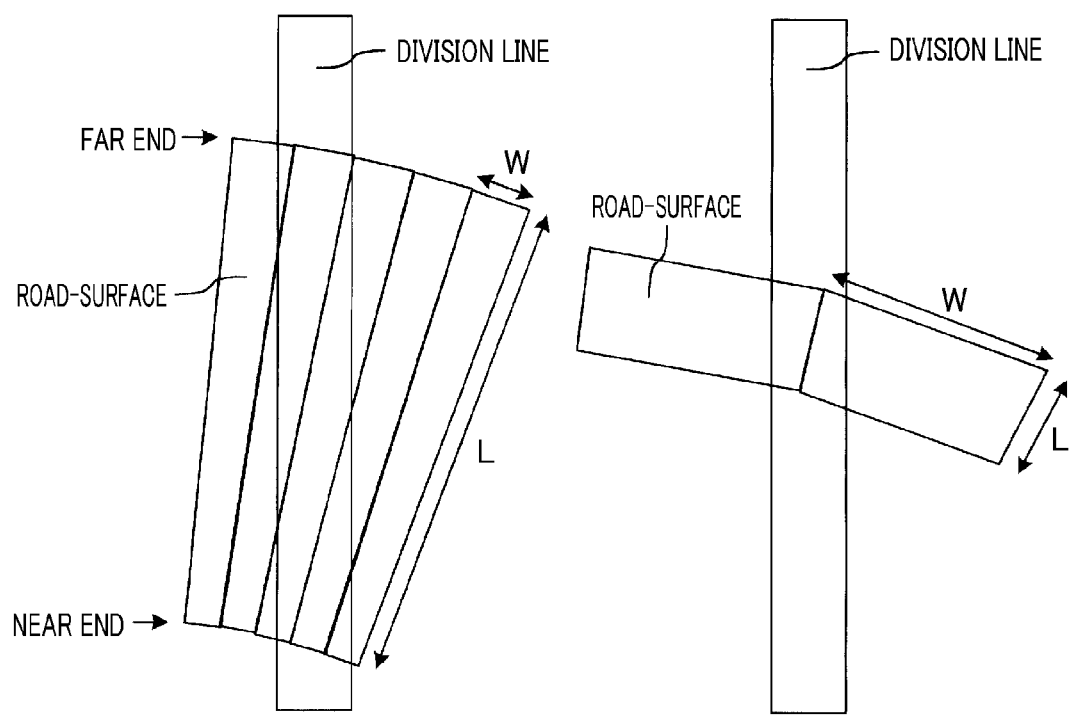
FIG. 13A is an explanatory diagram illustrating a relationship between road-surface radiation areas and a division line in the case where road-surface radiation areas are longitudinally long.
FIG. 13B is an explanatory diagram illustrating a relationship between road-surface radiation areas and a division line in the case where road-surface radiation areas are transversely long, the road surface radiation areas each having an aspect ratio different from that of each road-surface radiation area shown in FIG. 13A, with the space of each area remaining the same as that of each area shown in FIG. 13A.

FIG. 2 is an explanatory diagram specifically illustrating two-dimensional beam scan realized by the light emitter 10. FIG. 13A is an explanatory diagram illustrating the shape of each of radiation planes onto which laser beams are applied (hereinafter these planes are each referred to as "road-surface radiation area"). FIG. 13A is an enlarged diagram illustrating a region X of FIG. 2.

As shown in FIG. 13A, each road-surface radiation area has a longitudinally long shape having a length L in the longitudinal direction into which laser beams are radiated and a length W in the transverse direction perpendicular to the longitudinal direction and extending along a horizontal plane. The length L and the length W are set to satisfy a relation L>W (desirably, L>10W). Also, the transverse length W is set so as to be approximately equal to the width of a division line, i.e. an object to be detected, or to be shorter than the width of the division line. In the following description, in each of the road-surface radiation areas, an end portion near the LD 11 that is a light source is referred to as a "near end" and an end portion far from the LD 11 is referred to as a "far end".

The road-surface radiation area can be adjusted, for example, by adequately selecting the shape of the light-emitting lens 13 or by adequately adjusting the state of setting the light emitter 10 (the height of the emitter 10 or the optical axis direction of the laser beams).

FIG. 2 shows two types of beams $SB1j$ and $SB2j$ ($j=1, 2, \ldots n$) having different depression angles $\alpha 1$ and $\alpha 2$, respectively, and shows a scan area SA1 for performing line scan with the beam $SB1j$ and a scan area SA2 for performing line scan with the beam $SB2j$. However, the depression angle $\alpha 1$ of the beam $SB1j$ is set to be larger than the depression angle $\alpha 2$ of the beam $SB2j$.

It should be appreciated that a scan area SAi ($i=1, 2, \ldots m$) refers to a series of areas formed by the road-surface radiation areas for beams SBi1 to SBin. In order to distinguish from the entire scan area, the scan area SAi is hereinafter referred to as "partial scan area SAi". It should also be appreciated that the road-surface radiation areas are adjacent to each other with no gap therebetween.

As will be described later, a division line is detected based on regions in which the road-surface radiation areas overlap the division line (hereinafter these regions are referred to "overlap regions"). In this regard, the road-surface radiation areas are not required to be adjacent to each other with no gap therebetween. If only a division line can be detected based on the overlap regions of the road-surface radiation areas and the division line, adjacent road-surface radiation areas may be separated from each other.

In other words, a division line is detected from the results of detecting a reception signal which changes depending on the location of an overlap region in each of the road-surface radiation areas, and from the results of detecting a reception signal which changes depending on the size of the space of an overlap region in each of the road-surface radiation areas. For this reason, the road-surface radiation areas are not required to be necessarily adjacent to each other with no gap therebetween.

The description of the present embodiment set forth below is provided on the premise that the road-surface radiation areas are adjacent to each other with no gap therebetween.

In the following description, the road-surface radiation area formed by the beam SBij is simply referred to as "road-surface radiation area SBij".

The "beam SBij" refers to a laser beam that has been radiated in the $j^{th}$ order in a line scan of the beams SBi1 to SBin having an $i^{th}$-order large depression angle $\alpha i$. The "road-surface radiation area SBij" refers to a road-surface radiation area located at a $j^{th}$-order position from the left in the partial scan area SAi.

The depression angle $\alpha i$ of the beam SBij can be identified by an identifier i of the beam. Further, a distance up to the near end or the far end of the road-surface radiation area SBij can be identified based on information on an attachment position (e.g., height from the road surface) of the object detector 1. Also, a radiation angle $\theta j$ in the vehicle's widthwise direction (hereinafter referred to as "scan angle $\theta j$") can be identified from an identifier j of the beam SBij. Thus, a position in the vehicle's widthwise direction (transverse position) of the road-surface radiation area SBij can be defined from the identifier j of the beam SBij.

In performing line scan, the controller 40 outputs an LD drive signal so that the road-surface radiation areas SBi1 to SBin will be juxtaposed in the partial scan area SAi without a gap therebetween.

The number of beams n to be radiated under line scan for one line (the number of road-surface radiation areas) depends on the width of each laser beam and the size of the scan area. The timing of laser-beam transmission depends on the width of the laser beam and the speed of the scan. Therefore, the LD drive signal is set based on these items.

FIG. 2 shows only the scan areas SA1 and SA2 for line scan by two types of beams SB1j and SB2j (hereinafter also referred to as "short-range scan"), respectively. However, the controller 40 also performs line scan using one or more beams having a depression angle larger than those of the beams SB1j and SB2j (hereinafter also referred to as "long-range scan"). The partial scan areas of the long-range scan are formed being located farther than the partial scan areas SA1 and SA2 of the short-range scan, as viewed from the object detector 1.

The scanner drive circuit 15 drives the scanner mechanism 14 so that line scan is repeated to thereby realize two-dimensional beam scan. Specifically, in driving the scanner mechanism 14, the scanner drive circuit 15 sequentially switches the depression angle of the beam from a larger one to a smaller one (i.e. the partial scan area is sequentially switched from the one nearer to the vehicle to the one farther from the vehicle), every time line scan for one line is finished.

In other words, line scan is successively and repeatedly performed. In the following description, the line scans performed with the beams SB1j and SB2j are each referred to as the short-range scan, and the line scans (not shown) performed by beams SB3j to SBmj are each referred to as the long-range scan. The time required for all the line scans, i.e. the time required for radiating laser beams through the entire scan area is referred to as "scan cycle".

The specific configuration of the scanner mechanism 14, i.e. the mechanism for realizing two-dimensional scan, is based on a well-known technique, and thus specific description is omitted here. For example, however, the scanner mechanism 14 may be realized by a configuration in which the direction of radiation from a mirror is two-dimensionally changed, or by a configuration in which a polygon mirror having surfaces of a different slant angle is rotated.

The light receiver 20 includes a light-receiving lens 21, a light-receiving element 22 and an amplifier 23. The light receiving lens 21 collects light reflected from an object that has reflected the laser beams (horizontal beams). The light-receiving element 21 receives light via the light-receiving lens 21 and generates a light-reception signal having a voltage value corresponding to the intensity of the received light. The amplifier 23 amplifies the light-reception signal from the light-receiving element 22.

Figure 10:
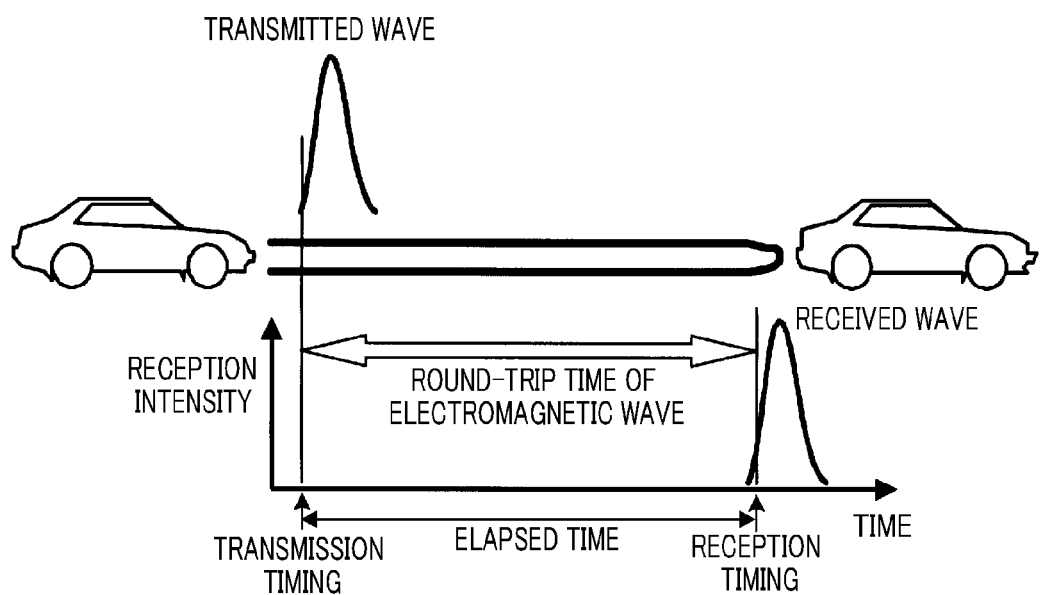
FIG. 10 is an explanatory diagram illustrating a relationship between transmission/reception timing of an electromagnetic wave and distance up to a target from which an electromagnetic wave is reflected.

Every time an LD drive signal is inputted from the controller 40, the measurement circuit 30 measures a phase difference between the LD drive signal and the light-reception signal obtained from the light receiver 20 (i.e. measures the round-trip time to and from an object from which a laser beam has been reflected). Then, the measurement circuit 30 calculates the results of the measurement in terms of distance to generate distance data. Thus, the measurement circuit 30 performs a process based on a so-called time-of-flight method (see FIG. 10), while generating intensity data indicating reception intensity of the light-reception signal.

Then, the distance data and the intensity data are correlated to the scan angle (the position of the beam in a sequence in one line scan) $\theta j$ at the time point when the data has been obtained. The measurement circuit 30 is configured to store the correlated data as measurement data for each line scan of a different beam depression angle, and at the same time, to supply the stored scan data to the controller 40 in response to a request from the controller 40.

In generating the distance data and the intensity data based on the results of transmission/reception of the laser beams, the technique described in JP-B-4274028 or JP-B-4375064, for example, may specifically be used.

The controller 40 is configured by a well-known microcomputer that includes a CPU, a ROM and a RAM.

The controller 40 at least performs a scan process, an object recognition process and a division line detection process. In the scan process, the controller 40 drives the light emitter 10 with the LD drive signal and the SC drive signal to carry out two-dimensional beam scan. In the object recognition process, the controller 40 generates object data concerning an object from which laser beams have been reflected, based on the measurement data (intensity data, distance data and scan angle) obtained through the scan process. In the division line detection process, the controller 40 generates division-line parameters.

Of these processes, the scan process is started for in each scan cycle. As explained above referring to FIG. 2, in the scan process, the LD drive signals and the SC drive signals are outputted so that line scans with beams of a different depression angle $\alpha i$ are performed for the number of times equal to the number of depression angles (m number of depression angles).

Since the object recognition process is well-known art and is not an essential part of the present invention, description is omitted here.

Referring now to FIG. 3, hereinafter is described the division line detection process.

The division line detection process is started every time the scan process is finished.

Upon start of the present process, at step S110, measurement data corresponding to one line scan are read out from the measurement circuit 30. Specifically, the measurement data corresponding to one line scan are read out from among the measurement data (intensity data, distance data and scan angle) of line scan categorized as short-range scan, which data are obtained as a result of performing the scan process.

At step S120, a series of intensity data and a series of distance data read out from the measurement circuit 30 are arranged in the order of obtaining from the line scan (in the order of from the left corner to the right corner in FIG. 2) and used as an intensity data sequence (i.e., a sequence (set) of intensity data) and a distance data sequence (i.e., a sequence (set) of distance data), respectively. The intensity data sequence and the distance data sequence are differentiated (to obtain a difference from the previous data) to generate a differential intensity data sequence consisting of a series of differential intensity data and a differential distance data sequence consisting of a series of differential distance data.

When the intensity data obtained from the $j^{th}$ beam is R(j) and the distance data obtained from the $j^{th}$ beam is D(j), differential intensity data DR(j) and differential distance data DD(j) are calculated from the following Formulas (1) and (2), respectively.

$$DR(j)=R(j+1)-R(j) \quad (1)$$

$$DD(j)=D(j+1)-D(j) \quad (2)$$

At step S130, a candidate range where an object that reflects laser beams may be present is extracted, based on a change in the differential intensity data sequence.

Figure 12A:
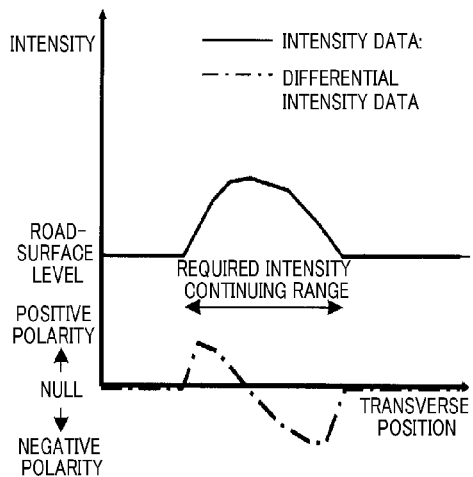
FIG. 12A is a graph illustrating an example of an intensity data sequence and a differential intensity data sequence.

Specifically, the extraction is conducted on the premise that the polarity of differential intensity data is "positive" when the data has a value larger than a preset intensity threshold of positive polarity, "negative" when smaller than a preset intensity threshold of negative polarity, and "null" when equal to or larger than the intensity threshold of negative polarity and equal to or smaller than the intensity threshold of positive polarity. Then, a region (scan angle range) in the differential intensity data sequence is extracted as a candidate range (required intensity continuing portion) (see the dash-dot lines in the graphs of FIGS. 12A and 12C). The region is sandwiched between the "nulls", and in this region, data polarity changes from positive to negative. The candidate range has a width corresponding to the width of at least two beams (four beams if the regions outside the boundaries of the candidate range are included).

Then, at step S140, a range exhibiting features of reflected light from a division line (e.g., white line) is defined, as an object range, from the candidate range extracted at step S130. This definition is made based on the change in the differential distance data sequence.

Specifically, at the previous step S130, the range (candidate range) exhibiting the features of the white line has been extracted based on the intensity data. At step S140, it is checked whether the candidate range has features of distance data. When the candidate range does have such features, the range is extracted as a range (object range) of beams that have been applied onto the white line.

More specifically, the extraction is conducted on the premise that the polarity of differential distance data is "positive" when the data has a value larger than a preset distance threshold of positive polarity, "negative" when smaller than a preset distance threshold of negative polarity, and "null" when equal to or larger than the distance threshold of negative polarity and equal to or smaller than the distance threshold of positive polarity. When the differential distance data sequence has a portion corresponding to the candidate range where data polarity shows the following change, the portion corresponding to candidate range is extracted as an object range.

Specifically, in a right-half scan angle range (hereinafter referred to as "first scan area"), scan is performed in a direction of departing from the center of the vehicle. In the first scan area, the candidate range is extracted as an object range if the data polarity of the differential distance data sequence changes positive, negative and positive in the portion corresponding to the candidate range and if the portion is sandwiched between the "nulls" (see the dash-dot lines of FIGS. 12B and 12D).

On the other hand, in a left-half scan angle range (hereinafter referred to as "second scan area"), scan is performed in a direction of approaching the center of the vehicle. In the second scan area, the candidate range is extracted as an object range if the data polarity of the differential distance data sequence changes negative, positive and negative in the portion corresponding to the candidate range and if the portion is sandwiched between the "nulls".

At step S150, positions of the division line at the left and right ends of the extracted object range (hereinafter referred to as "left-end position Li" and "right-end position Ri") are calculated. The calculation is made based on the scan angles at the left and right ends of the extracted object range, as well as the distance data regarding these scan angles (or the distance data regarding scan angles where the polarity of differential intensity data is continuously "null") (see FIG. 4A). In the present embodiment, the left-end position Li corresponds to the start-side end position and the right-end position Ri corresponds to the end-side end position.

Figure 4B:
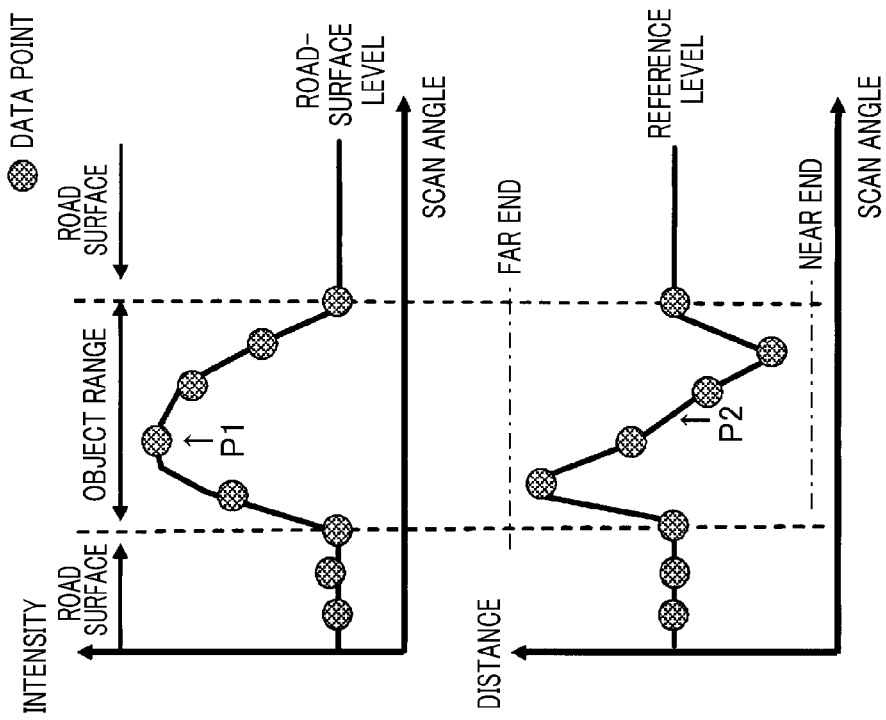
FIG. 4B is a graph illustrating measurement results of the intensity data (top) and the distance data (bottom) in the region X.
Figure 4A:
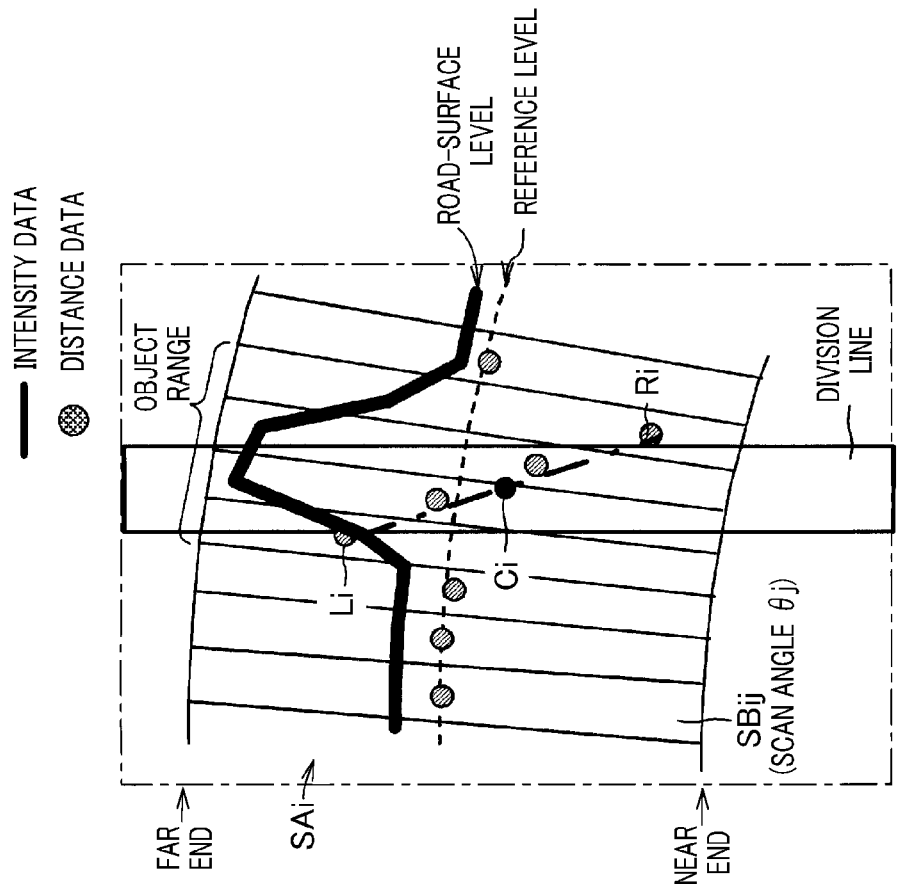
FIG. 4A is an explanatory diagram illustrating an enlarged view of a region (region X shown in FIG. 2, where a division line resides) superposed with measurement results of intensity data and distance data in the region X.

At step S160, a position Ci of a middle point is calculated, the middle point residing in a line segment connecting between the left- and right positions Li and Ri which have been calculated at step S150. In FIG. 4B, the graph at the top shows an example of measurement results of intensity data in the region X of FIG. 2, and the graph at the bottom similarly shows an example of measurement results of distance data in the region X. FIG. 4A shows an enlarged view of the region X, being superposed with the measurement results of the intensity data (solid line) and the measurement results of the distance data (dots).

In FIG. 4A, the regions where the road-surface radiation areas defined by the beams overlap the division line (overlap regions), are present in four road-surface radiation areas. Overlap spaces of these respective overlap regions in the four road-surface radiation areas turn small→large→middle→small, as beam scan proceeds from the left to right road-surface radiation areas, as viewed in the figure. As the size of the spaces of the overlap regions changes between the adjacent road-surface radiation areas, the level of reception signals changes.

In this way, the intensity data are measured and indicated as signal levels in conformity with the size of the spaces of the overlap regions, as indicated by the solid line in FIG. 4A and by the graph at the top in FIG. 4B, drawing the shape of an arch or a projection.

Also, in FIG. 4A, the positional relationship between the overlap regions in the road-surface radiation areas can be seen from the change of the location of the overlap regions covering: far end of a road-surface radiation area→approximately the entirety of a road-surface radiation area→a portion of the upper half (far end side) and approximately the entire lower half (near end side) of a road-surface radiation area→near end of a road-surface radiation area, as beam scan proceeds from the left to right road-surface radiation areas, as viewed in the figure. As the location of the overlap regions change between the adjacently located road-surface radiation areas, the level of reception signals changes.

In this way, the distance data are measured and indicated as signal levels in conformity with the location of the overlap regions, as indicated by the dash-dot line in FIG. 4A and by the graph at the bottom in FIG. 4B, drawing a projection and a recess in the direction of the beam scan (from the left to the right in the figure).

At step S170, it is determined whether or not the above processing (steps S110 to S160) has been carried out by the number of times corresponding to the required number of line scans (specifically two in the present embodiment, which corresponds to the number of line scans allocated to the short-range scan). If a negative determination is made at step S170, control returns to step S110 to repeat the similar processing regarding measurement data resulting from the short-range scan that uses the laser beams of a different depression angle $\alpha i$.

If it is determined at step S170 that the processing for the required number of line scans has been finished, control proceeds to step S180 to perform the following calculation. This calculation uses a left-end position, a right-end position and a middle-point position calculated for each of the line scans. Specifically, the inclinations (with respect to the forward direction of the vehicle) are calculated for the line connecting the left-end positions, the line connecting the right-end positions and the line connecting the middle-point positions (see FIG. 5).

Then, an average value of the inclinations is calculated. Alternatively, weighting may be increased in the inclinations of these lines in the division line and a weighted average value may be calculated. The calculated average value or the weighted average value is used as an inclination of the division line. Then, the width of the division line is calculated based on spacing between the left- and right-end positions in the same scan and the inclination of the division line previously calculated.

Figure 5:
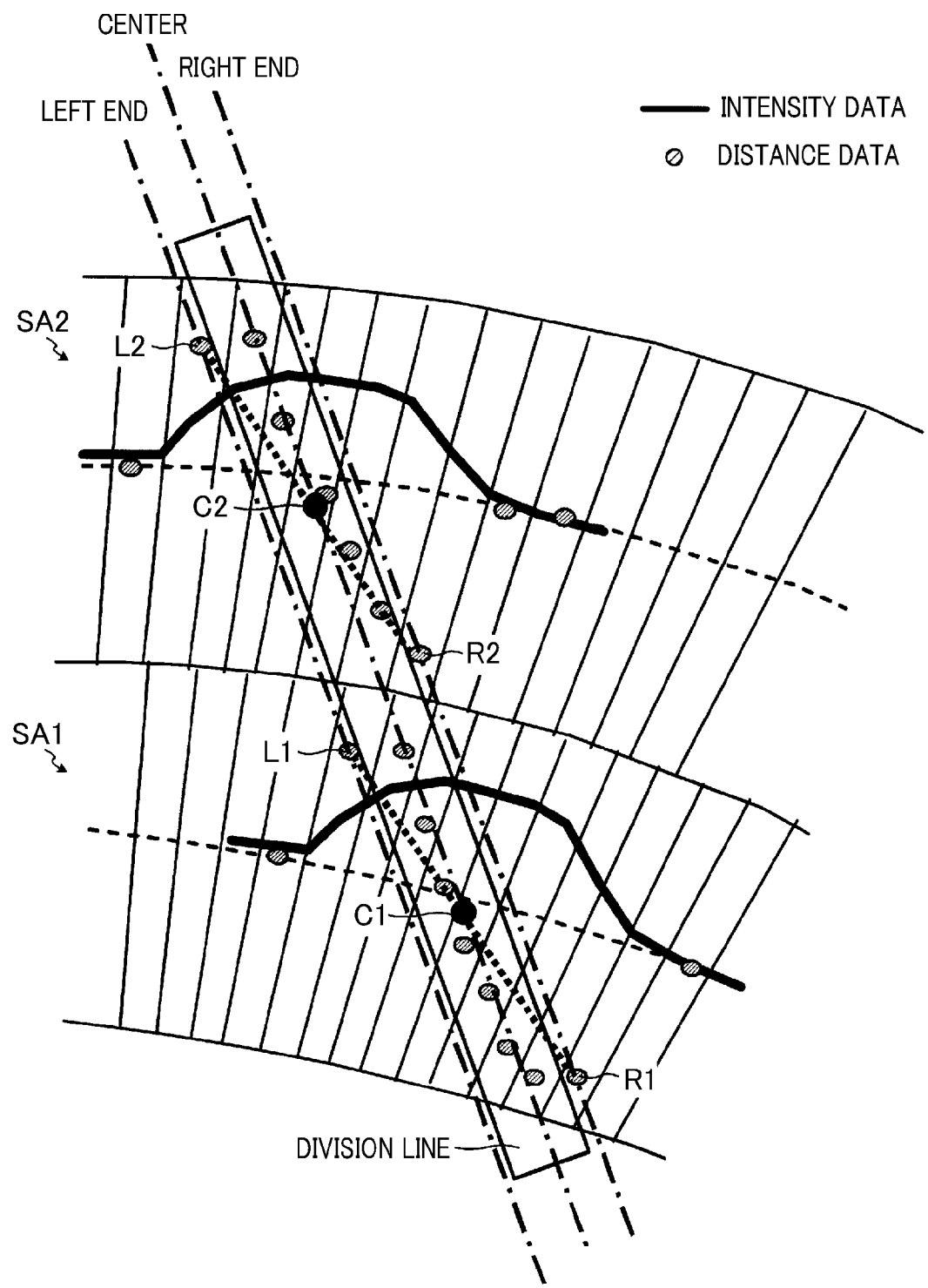
FIG. 5 is an explanatory diagram illustrating detection results of intensity data and distance data, as well as a calculation method for the location and inclination of a division line, in the case where the division line has an inclination with respect to the vehicle.

FIG. 5 is an explanatory diagram illustrating detection results of intensity data and distance data and a calculation method for the location and inclination of a division line, in the case where the division line is inclined with respect to the vehicle. Specifically, FIG. 5 shows the measurement results (intensity data indicated by the solid line and distance data indicated by dots) of the short-range scan in the partial scan areas SA1 and SA2 using the beams SB1j and SB2j, respectively. FIG. 5 also shows the lines connecting the left-end positions (indicated by the left-end dash-dot line), the right-end positions (indicated by the right-end dash-dot line) and the middle-point positions (indicated by the middle dash-dot line), which are calculated for each scan. The measurement results and the lines are superposed on a diagram showing a relationship between the division line and the road-surface radiation areas, in the vicinity of the scan area where the division line resides.

At step S190, division-line parameters are outputted to an external unit. Specifically, the division-line parameters include the position of a division line, i.e. the left-end position calculated at step S150 if the division line resides in the first scan area, the right-end position calculated at step S150 if the division line resides in the second scan area, and also include the inclination and the width of the division line calculated at step S180. After outputting these parameters, the present division line detection process is ended.

As described above, in detecting a division line, the object detector 1 puts a focus not only on the change caused in an intensity data sequence but also on the change caused in a distance data sequence to thereby define an object range from which reflected light of the division line is obtained. The division line is detected using regions where the road-surface radiation areas overlap the division line (overlap regions) that is an object to be detected. Specifically, the division line is detected based on the change of the location (change caused in a distance data sequence) and the change of the space (change caused in an intensity data sequence) of the overlap region caused in each of the adjacently located road-surface radiation areas.

In particular, in the case of the detection using the distance data sequence, focus is put on the change unique to a band shape that extends long along the road. Accordingly, the edges of a division line can be properly detected and thus the division line on a road surface can be highly accurately detected. Regarding the distance data sequence, the features of the change appearing thereon are small when multiple consecutive road-surface radiation areas overlap the division line. Therefore, the features, per se, that appear on the distance data sequence are likely to be determined as being noise.

To cope with this, the division line may be detected also using the features appearing on the intensity data as in the embodiment described above. The location at which the division line resides can be identified based on the level of reflection intensity (intensity data) of a reception signal. Using this, the edges of a division line, i.e. an object to be detected, can be detected after identifying the location of the division line. As a result, the division line is more reliably detected with good accuracy.

Thus, the object detector 1 is favorably used for vehicle control, such as lane keeping assist, under which the location of a division line is required to be accurately calculated in order to ensure safety.

Further, the object detector 1 detects the changes caused in an intensity data sequence and a distance data sequence by differentiating these data sequences and focusing on the polarities of the resultant differential intensity data sequence and differential distance data sequence, instead of directly detecting the changes from the intensity data sequence and the distance data sequence.

Figure 12C:
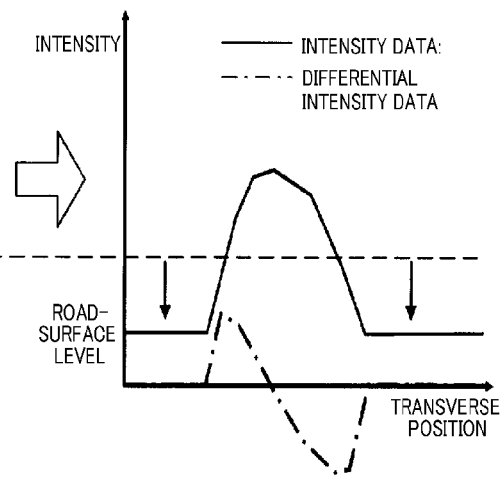
FIG. 12C is a graph illustrating an example of a differential intensity data sequence in the case where an offset level of the intensity data sequence is fluctuated.
Figure 12B:
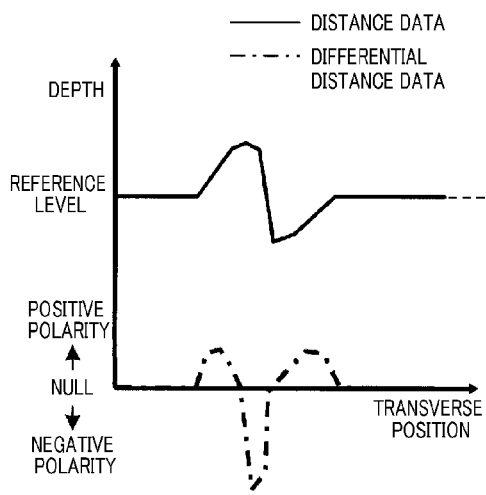
FIG. 12B is a graph illustrating an example of a distance data sequence and a differential distance data sequence.
Figure 12D:
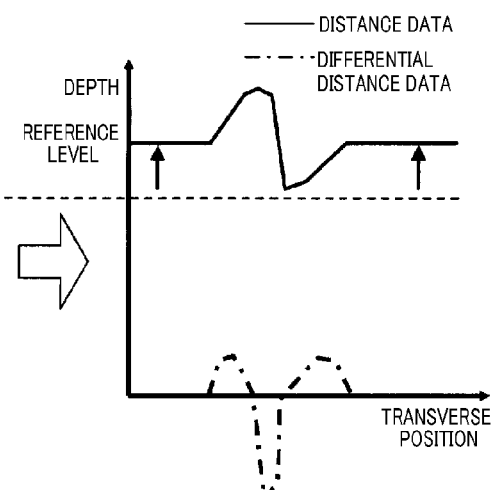
FIG. 12D is a graph illustrating an example of a differential distance data sequence in the case where an offset level of the distance data sequence is fluctuated.

Due to the changes of reflecting conditions of the road surface depending such as on time and weather, or due to the change of the depression angle of the laser beams depending such as on the pitching of the vehicle body, there may be a change, as shown in FIGS. 12C and 12D, in the offset level (level at the time when reflection is received only from the road surface), i.e. a road surface level or a reference level, of the intensity and distance data sequences. However, since the differential data sequence and the differential distance data sequence are not affected by the changes of the conditions, the object detector 1 is able to correctly extract the changes that appear on the intensity and distance data sequences and thus is able to further enhance the accuracy of detecting a division line.

As a result, the detection results of the location of a division line obtained by the object detector 1 are applicable to the vehicle control, such as lane keeping control, that requires high safety.

Figure 7:
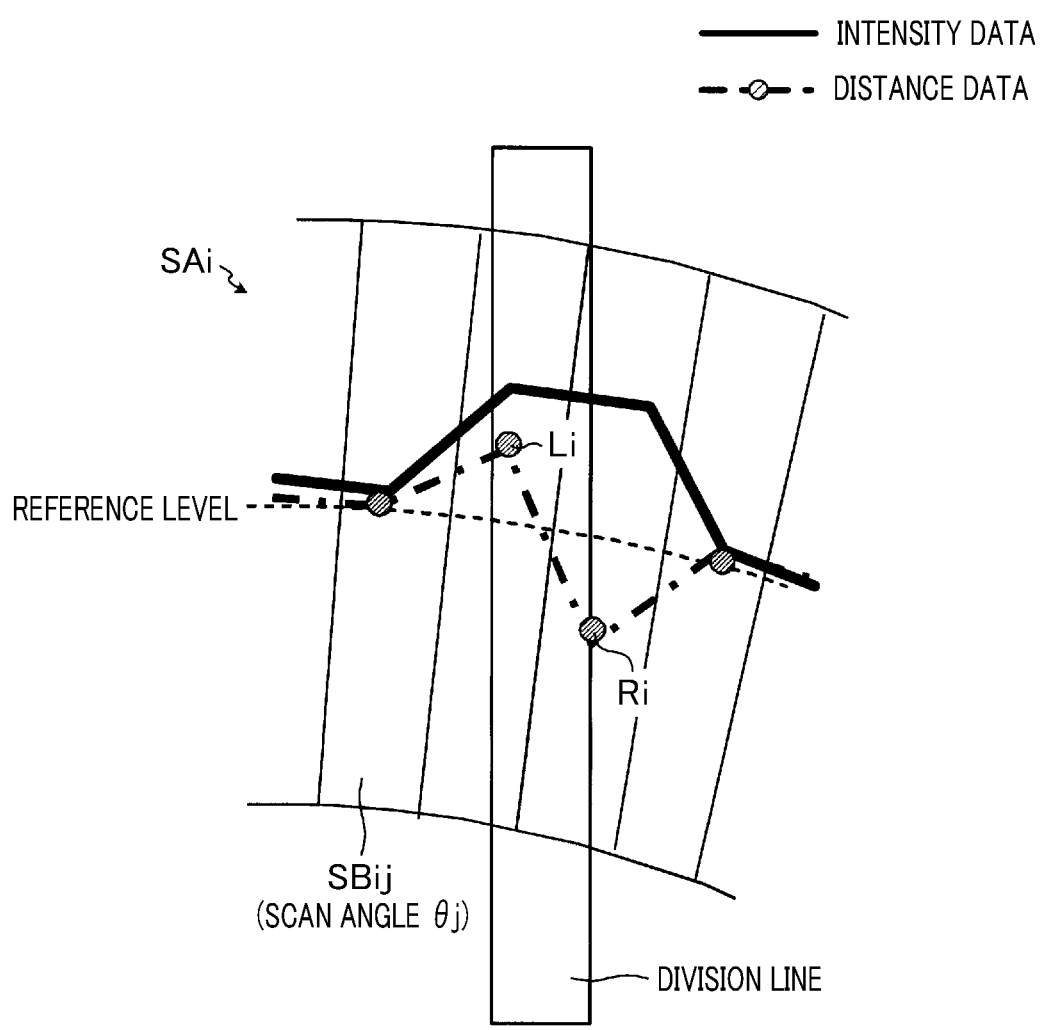
FIG. 7 is an explanatory diagram illustrating minimal conditions that enable detection of a division line.

As shown in FIGS. 6A to 6C, as the number of laser beams that have hit a division line is increased, the object detector 1 obtains more intensity and distance data concerning the division line and thus will more appropriately obtain the features of the division line appearing on the intensity and distance data. Thus, the object detector 1 is able to enhance the accuracy of detecting the location of the division line. However, as shown in FIG. 7, a minimum of two beams that have hit a detection line will allow the features of the division line to appear on the intensity data and the distance data and thus will enable detection of the location of the division line.

FIG. 8 shows measurement results in an actual traveling scene. In FIG. 8, (a) shows an image of a landscape in the forward direction of the vehicle, which image is superposed with intensity data that have been obtained by the short-range scan using two scan lines. In FIG. 8, (b) shows a graph having the horizontal axis indicating the transverse position and the vertical axis indicating the depth, being plotted thereon with distance measurement data. As can be seen from FIG. 8, the features similar to those shown in the graphs of FIGS. 4A and 4B are obtained in the regions where the division lines actually reside.

In the above embodiment, the light emitter 10 corresponds to the beam scanning means. The measurement circuit 30 corresponds to the measuring means. Step S110 corresponds to the data receiving means and the data receiving step. Steps S120 to S160 correspond to the detecting means and the detecting step. Steps 120 to S140 correspond to the extracting means and the extracting step. Steps S150 and S160 correspond to the location calculating means and the location calculating step. Step S180 corresponds to the inclination calculating means.

MODIFICATIONS

An embodiment of the present application has been described so far. However, the present invention is not limited to the embodiment described above but may be implemented in various modes within a scope not departing from the spirit of the present invention.

For example, a differential intensity data sequence has been used in extracting a candidate range in the above embodiment, however, an intensity data sequence may be used instead. In this case, regions to be extracted as a candidate range may be successive regions corresponding to two or more laser beams, which include intensity data of a level that implies the presence of some sort of object.

In the above embodiment, a differential distance data sequence has been used in extracting an object range from a candidate range, however, a distance data sequence may be used instead. In this case, a reference level of a distance data value may be set to a level which is detected when no reflective objects reside in the road surface (the level corresponding to a distance in the vicinity of a midpoint between a near end and a far end of a beam radiation plane).

Then, in the first scan area, a range may be extracted as an object range from the candidate range. Specifically, in this extracted range, the distance data value reaches, for a time, to a level corresponding to a distance in the vicinity of a farthest end of a beam, decreases to a level corresponding to a distance in the vicinity of a nearest end of a beam, and then returns to the reference level.

Also, in the second scan region, a range may be extracted as an object range from the candidate range. Specifically, in this extracted range, the distance data value reaches, for a time, to a level corresponding to a distance in the vicinity of a nearest end of a beam, increases to a level corresponding to a distance in the vicinity of a farthest end of a beam, and then returns to the reference level.

In the embodiment described above, the position of a division line has been indicated by the left-end position (when the division line is in the first scan area) or the right-end position (when the division line is in the second scan area) of an object range. Alternative to this, the position of a division line may be indicated by the middle position of an object range, or may be indicated by a position shifted to the left (when the division line is in the first scan area) or to the right (when the division line is in the second scan area) by ½ of the width of the division line, as predetermined, from the middle position.

In the embodiment described above, the middle-point position $C_i$ has been the middle position between the left-end position $L_i$ and the right-end position $R_i$ of an object range. Alternatively, for example, the middle-point position $C_i$ may be the position calculated from a scan angle at which the intensity data is maximized in an object range (see P1 of FIG. 4B) and the distance data at this scan angle. Alternatively, the middle-point position $C_i$ may be the position calculated from a scan angle at which the distance data traverses a reference level within an object range (see P2 of FIG. 4B) and the reference level (i.e. the distance in the vicinity of the middle position of the beam radiation plane).

In the embodiment described above, the division line detection process has been performed by conducting line scan for a plurality of times with beams having a different depression angle and by using data obtained in the same one scan cycle. Alternatively, the division line detection process may be performed by conducting line scan with beams having the same depression angle while the vehicle is moving and by using data obtained over a plurality of scan cycles.

Figure 9:
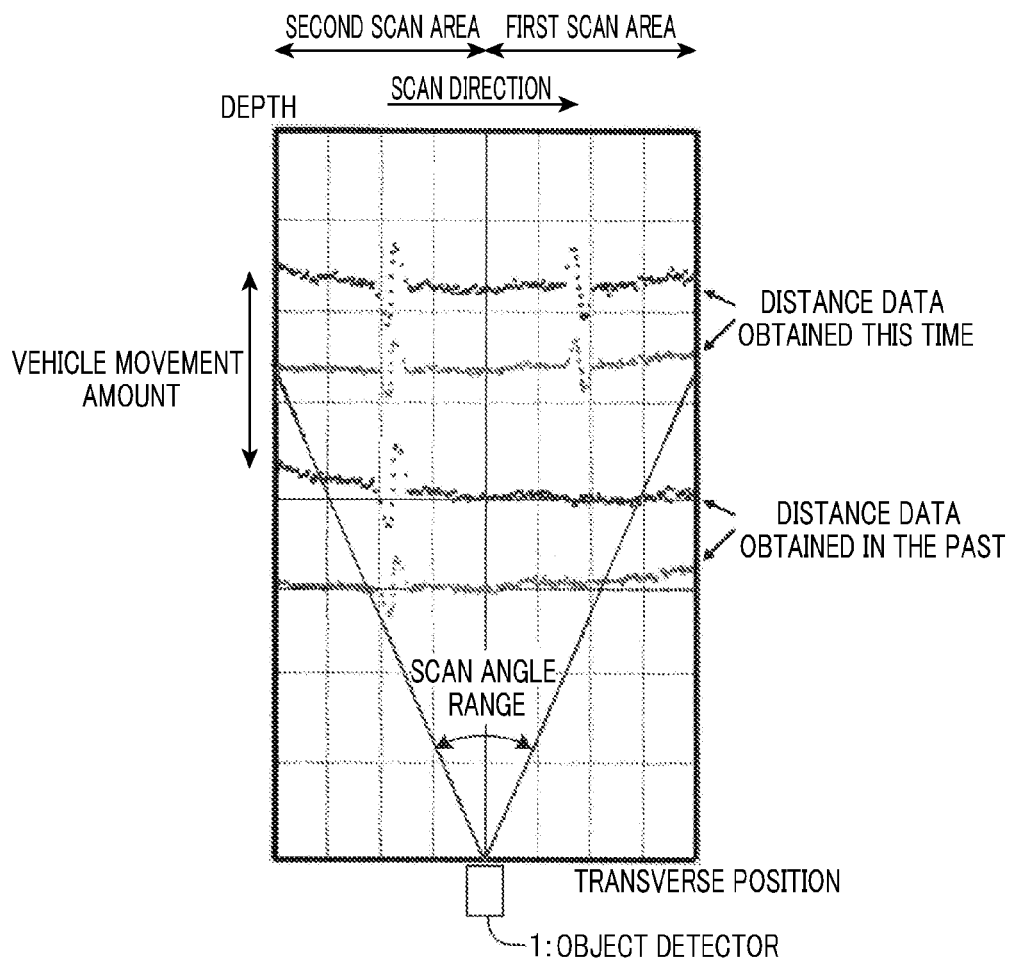
FIG. 9 is a graph illustrating actual measurement values of distance data according to a modification.

FIG. 9 is a graph showing distance data obtained by two line scans with beams having a different depression angle and distance data obtained in a scan cycle in the past (the previous cycle in the figure). In the figure, the horizontal axis indicates the transverse position and the vertical axis indicates the depth that is the traveling direction of the vehicle. However, the past distance data is shifted to the side of the vehicle by an amount corresponding to the distance the vehicle has moved before the latest distance data is obtained.

Use of data obtained over a plurality of scan cycles with a time lag means that the division line detection process is performed using much more data than the data that would be obtained in one scan cycle. FIG. 9 shows that line scan is performed twice for each scan cycle. Alternative to this, however, one line scan, or three or more line scans may be performed for each scan cycle.

In the embodiment described above, the scan area has been scanned from the left end to the right end. Alternatively, the scan area may be scanned from the right end to the left end. In this case, the left half of the scan area is the first scan area and the right half of the scan area is the second scan area.

In the embodiment described above, laser beams have been radiated in the forward direction of the vehicle to detect a division line, and the like. Alternatively, however, it may be so configured that laser beams are radiated in the backward direction of the vehicle to detect a division line, and the like (e.g., a line that divides a parking space), so that the detection is used for parking assist.

In the embodiment described above, laser beams have been used, however, instead of light, electromagnetic waves may be used.

In the embodiment described above, two-dimensional scan has been carried out, however, one-dimensional scan may be carried out.

Also, instead of scan, a range image may be obtained for each partial scan area or for the entire scan area, and then the similar process may be performed using a distance data sequence extracted from horizontally arranged pixels.

In detecting a division line, the object detector 1 of the above embodiment has put a focus on not only the change caused in an intensity data sequence but also the change caused in a distance data sequence to define an object range in which reflected light is obtained from a division line. However, defining an object range is not limited to this. For example, without using the change caused in an intensity data sequence, the features appearing on a distance data sequence may be used for the detection of a division line. In this case, every time a beam-formed electromagnetic wave is transmitted/received, a reception signal may be used as the features appearing on a distance data sequence. The reception signal changes with the change of the location of an overlap region in each of the road-surface radiation areas.

Specifically, a division line is detected by determining the features of the change in a distance data sequence, for each of a plurality of beams arranged in sequence, based on a detected reception signal that changes in response to the location of an overlap region in each of the road-surface radiation areas.

In this way, a division line is detected using the features appearing on a distance data sequence when multiple consecutive road-surface radiation areas overlap the division line. This way of detecting a division line is very effective in a sense of ensuring the detection accuracy.

When a division line is detected using a distance data sequence without using an intensity data sequence, the change of the features appearing on the distance data sequence may be small and thus the features are likely to be determined as being noise. If this is required to be avoided, the location where the division line resides may be defined through the following process.

Specifically, division lines are painted parallel to a road, with the spacing therebetween being substantially even. Therefore, as viewed from the vehicle that travels straight ahead along a lane, the division lines are considered to be located on the left and right sides of the vehicle, being approximately evenly distanced from a straight line extending in the forward direction of the vehicle and passing through the center of the vehicle. The location of each of the division lines, in this case, with respect to the vehicle can be easily calculated based on the distance between the division lines and the distance from the vehicle to each of the division lines on the left and right sides of the vehicle. Thus, if the features appearing on a distance data sequence in a received signal are detected in the calculated location of each of the division lines, these features are determined as not being noise. Thus, based on the features of the change in the obtained distance data sequence, the subsequent detection process is performed for each of the division lines.

In this way, the edges of a division line are appropriately detected when multiple consecutive road-surface radiation areas overlap the division line, based on the features of the change caused in a distance data sequence, without using the change caused in an intensity data sequence. Accordingly, the division line is highly accurately detected.

As described above, the object detector 1 can be favorably used for the control, such as lane keeping assist, under which the locations of division lines are required to be accurately calculated to ensure safety.

What is claimed is:

1. An apparatus for detecting a division line depicted on a road on which a vehicle equipped with the apparatus, comprising:
    beam scanning means for scanning a beam-formed electromagnetic wave toward the road viewed from the vehicle, the beam-formed electromagnetic wave being transmitted repetitively at intervals along different directions in a width direction of the vehicle and a reflected electromagnetic wave from the road being received, each beam-formed electromagnetic wave being radiated to a radiation area on the road, the radiation areas made by transmitting the beam-formed electromagnetic wave a plurality of times virtually producing a scan area on the road;
    measuring means for measuring, for every beam-formed electromagnetic wave, distance data indicative of a distance between a division line on the road and the vehicle, based on information about the reflected electromagnetic wave received by the beam scanning means and an interval between transmission of the beam-formed electromagnetic wave and an appearance of a peak of an electric signal responding to the received reflected electromagnetic wave;
    data receiving means for receiving the distance data measured by the measuring means; and
    detecting means for detecting the division line on the road based on a specific change predetermined in a sequence of the distance data produced by mapping the received distance data in a scanning order of the beam-formed electromagnetic wave, the specific change being up-and-down changes in the distance data that intersect a reference level previously assigned to the distance data.

2. The apparatus of claim 1, wherein the detecting means comprises
    extracting means for extracting distance data of a road position from which the specific change is estimated; and
    location calculating means for calculating a location of the division line based on the distance data extracted by the extracting means.

3. The apparatus of claim 2, wherein the detecting means includes
    means for differentiating the sequence of the extracted distance data to obtain a sequence of differentiated distance data, and
    means for providing, to the specific change of the distance data, a part of the sequence of the differentiated distance data, the part of the sequence of the differentiated distance data showing either a first change in a polarity thereof or a second change in the polarity thereof, the first change in the polarity of the differentiated distance data showing a temporary negative polarity before and after a continuous positive polarity, the second change in the polarity of the differentiated distance data showing a temporary positive polarity before and after a continuous negative polarity.

4. The apparatus of claim 2, wherein the location calculating means has a capacity to calculate, as the location of the division line, a location based on both specific distance data detected at an end near to a center of each of the radiation areas and an angle showing a direction of the beam-formed electromagnetic wave radiated to obtain the specific distance data.

5. The apparatus of claim 2, wherein the location calculating means has a capacity to calculate, as the location of the division line, a center between two locations based on both the distance data detected at both ends of the candidate range and angles showing directions of the beam-formed electromagnetic wave used to obtain the distance data detected at both ends of the candidate range.

6. The apparatus of claim 2, further comprising inclination calculating means for calculating an inclination of the division line based on data sequentially in time calculated by the location calculating means.

7. The apparatus of claim 1, wherein the specific change of the distance data is either a first change that the distance data is temporarily increased more than the reference level, then decreased less than the reference level, and then returns to the reference level or a second change that the distance data is temporarily decreased less than the reference level, then increased more than the reference level, and then returns to the reference level.

8. The apparatus of claim 1, wherein the beam scanning means has a capacity to scan the beam-formed electromagnetic wave such that two or more mutually juxtaposed radiation areas among the radiation areas are overlapped with the division line in the scan area, except that a direction of any of the beam-formed electromagnetic waves agrees with a direction of the division line.

9. The apparatus of claim 1, wherein the beam scanning means has a capacity to scan the beam-formed electromagnetic wave such that each of the radiation areas has a first length in a radiation direction of the beam-formed electromagnetic wave and a second length in an alignment direction along which the radiation areas align, the first length being longer than the second length.

10. An apparatus for detecting a division line on a road on which a vehicle equipped with the apparatus travels:
   beam scanning means for scanning a beam-formed electromagnetic wave toward the road viewed from the vehicle, the beam-formed electromagnetic wave being transmitted repetitively at intervals along different directions in a width direction of the vehicle and an reflected electromagnetic wave from the road being received, each beam-formed electromagnetic wave being radiated to a radiation area on the road, the radiation areas made by transmitting the beam-formed electromagnetic wave a plurality of times virtually producing a scan area on the road;
   measuring means for measuring, for every beam-formed electromagnetic wave, both intensity data indicative of intensity of the received reflected electromagnetic wave and distance data indicative of a distance between a division line on the road and the vehicle, based on information about the reflected electromagnetic wave received by the beam scanning means and an interval between transmission of the beam-formed electromagnetic wave and an appearance of a peak of an electric signal responding to the received reflected electromagnetic wave;
   data receiving means for receiving both the intensity data and the distance data measured by the measuring means; and
   detecting means for detecting the division line on the road based on specific changes predetermined in both a sequence of the intensity data and a sequence of the distance data produced by mapping the received intensity data and distance data in a scanning order of the beam-formed electromagnetic wave, respectively, at least one of the specific changes being changes in a corresponding one of differentiated intensity data and differentiated distance data, the corresponding differentiated data changing in negative and positive polarities thereof.

11. The apparatus of claim 10, wherein the detecting means comprises
   extracting means for extracting distance data from which the specific change of the distance data is detected, from the sequence of the distance date detected in a candidate range, the candidate range being part of the scan area, the part of the scan area providing a specific part of intensity data which belong to the sequence of the intensity data and continuously has a magnitude showing existence of an object in the sequence of the intensity data; and
   position calculating means for calculating a position of the division line based on the distance data extracted by the extracting means.

12. The apparatus of claim 11, wherein the detecting means includes
   means for differentiating the sequence of the intensity data to obtain a sequence of differentiated intensity data, and
   means for providing, as the specific change of the intensity data, a part of the sequence of the differentiated intensity data, the part of the sequence of the differentiated intensity data showing a change in a polarity thereof such that the polarity is positive and then maintained negatively.

13. The apparatus of claim 12, wherein the detecting means includes
   means for differentiating the sequence of the extracted distance data to obtain a sequence of differentiated distance data, and
   means for providing, as the specific change of the distance data, a part of the sequence of the differentiated distance data, the part of the sequence of the differentiated distance data showing either a first change in a polarity thereof or a second change in the polarity thereof, the first change in the polarity of the differentiated distance data showing a temporary negative polarity before and after a continuous positive polarity, the second change in the polarity of the differentiated distance data showing a temporary positive polarity before and after a continuous negative polarity.

14. The apparatus of claim 11, wherein the location calculating means has a capacity to calculate, as the location of the division line, a location based on an angle showing a direction of the electromagnetic wave used to obtain the intensity data showing a maximum value thereof within the candidate range and the distance data acquired by the electromagnetic wave used to obtain the intensity data showing the maximum value thereof within the candidate range.

15. The apparatus of claim 11, wherein the detecting means includes
   means for differentiating the sequence of the extracted distance data to obtain a sequence of differentiated distance data, and
   means for providing, as the specific change of the distance data, a part of the sequence of the differentiated distance data, the part of the sequence of the differentiated distance data showing either a first change in a polarity thereof or a second change in the polarity thereof, the first change in the polarity of the differentiated distance data showing a temporary negative polarity before and after a continuous positive polarity, the second change in the polarity of the differentiated distance data showing a temporary positive polarity before and after a continuous negative polarity.

16. The apparatus of claim 11, further comprising inclination calculating means for calculating an inclination of the division line based on data sequentially in time calculated by the location calculating means.

17. The apparatus of claim 10, wherein the specific change of the distance data is either a first change that the distance data is temporarily increased more than a reference level previously assigned to the distance data, then decreased less than the reference level, and then returns to the reference level or a second change that the distance data is temporarily decreased less than the reference level, then increased more than the reference level, and then returns to the reference level.

18. The apparatus of claim 10, wherein the beam scanning means has a capacity to scan the beam-formed electromagnetic wave such that two or more mutually juxtaposed radiation areas among the radiation areas are overlapped with the division line in the scan area, except that a direction of any of the beam-formed electromagnetic waves agrees with a direction of the division line.

19. The apparatus of claim 10, wherein the beam scanning means has a capacity to scan the beam-formed electromagnetic wave such that each of the radiation areas has a first length ni a radiation direction of the beam-formed electromagnetic wave and a second length in an alignment direction along which the radiation areas align, the first length being longer than the second length.

20. A method of detecting a division line depicted on a road on which a vehicle travels, comprising steps of:
   scanning a beam-formed electromagnetic wave toward the road viewed from the vehicle, the beam-formed electromagnetic wave being transmitted repetitively at intervals along different directions in a width direction of the vehicle and an reflected electromagnetic wave from the road being received, each beam-formed electromagnetic wave being radiated to a radiation area on the road, the radiation areas made by transmitting the beam-formed electromagnetic wave a plurality of times virtually producing a scan area on the road;
   measuring, for every beam-formed electromagnetic wave, distance data indicative of a distance between a division line on the road and the vehicle, based on information about the reflected electromagnetic wave received and an interval between transmission of the beam-formed electromagnetic wave and an appearance of a peak of an electric signal responding to the received reflected electromagnetic wave;
   receiving the distance data measured; and
   detecting the division line on the road based on a specific change predetermined in a sequence of the distance data produced by mapping the received distance data in a scanning order of the beam-formed electromagnetic wave, the specific change being up-and-down changes in the distance data that intersect a reference level previously assigned to the distance data.

21. The method of claim 20, wherein the detecting step includes extracting distance data of a road position from which the specific change is estimated; and
   calculating a location of the division line based on the distance data extracted by the extracting step.

22. The apparatus of claim 21, wherein the detecting step includes
   differentiating the sequence of the extracted distance data to obtain a sequence of differentiated distance data, and
   providing, as the specific change of the distance data, a part of the sequence of the differentiated distance data, the part of the sequence of the differentiated distance data showing either a first change in a polarity thereof or a second change in the polarity thereof, the first change in the polarity of the differentiated distance data showing a temporary negative polarity before and after a continuous positive polarity, the second change in the polarity of the differentiated distance data showing a temporary positive polarity before and after a continuous negative polarity.

23. The method of claim 20, wherein the specific change of the distance data is either a first change that the distance data is temporarily increased more than the reference level, then decreased less than the reference level, and then returns to the reference level or a second change that the distance data is temporarily decreased less than the reference level, then increased more than the reference level, and then returns to the reference level.

24. A method of detecting a division line on a road on which a vehicle travels:
   scanning a beam-formed electromagnetic wave toward the road viewed from the vehicle, the beam-formed electromagnetic wave being transmitted repetitively at intervals along different directions in a width direction of the vehicle and an reflected electromagnetic wave from the road being received, each beam-formed electromagnetic wave being radiated to a radiation area on the road, the radiation areas made by transmitting the beam-formed electromagnetic wave a plurality of times virtually producing a scan area on the road;
   measuring, for every beam-formed electromagnetic wave, both intensity data indicative of intensity of the received reflected electromagnetic wave and distance data indicative of a distance between a division line on the road and the vehicle, based on information about the reflected electromagnetic wave received and an interval between transmission of the beam-formed electromagnetic wave and an appearance of a peak of an electric signal responding to the received reflected electromagnetic wave;
   receiving both the intensity data and the distance data which are measured; and
   detecting the division line on the road based on specific changes predetermined in both a sequence of the intensity data and a sequence of the distance data produced by mapping the received intensity data and distance data in a scanning order of the beam-formed electromagnetic wave, respectively, at least one of the specific changes being changes in a corresponding one of differentiated intensity data and differentiated distance data, the corresponding differentiated data changing in negative and positive polarities thereof.

25. The method of claim 24, wherein the detecting step includes extracting distance data from which the specific change is detected, from the sequence of the distance date detected in a candidate range, the candidate range being part of the scan area, the part of the scan area providing a specific part of intensity data which belong to the sequence of the intensity data and continuously has a magnitude showing existence of an object in the sequence of the intensity data; and calculating a position of the division line based on the distance data extracted by the extracting step.

26. The method of claim 25, wherein the detecting step includes steps of:
   differentiating the sequence of the intensity data to obtain a sequence of differentiated intensity data, and
   providing, as the specific change of the intensity data, a part of the sequence of the differentiated intensity data, the part of the sequence of the differentiated intensity data showing a change in a polarity thereof such that the polarity is positive and then maintained negatively.

* * * * *